United States Patent [19]
Henshaw et al.

[11] Patent Number: 5,991,033
[45] Date of Patent: Nov. 23, 1999

[54] INTERFEROMETER WITH AIR TURBULENCE COMPENSATION

[75] Inventors: Philip D. Henshaw, Carlisle; Robert F. Dillon, Stoneham, both of Mass.

[73] Assignee: Sparta, Inc., Lexington, Mass.

[21] Appl. No.: 08/933,228

[22] Filed: Sep. 18, 1997

Related U.S. Application Data

[60] Provisional application No. 60/026,428, Sep. 20, 1996.

[51] Int. Cl.$^6$ .................................................. G01B 9/02
[52] U.S. Cl. ........................... 356/349; 356/358; 356/361
[58] Field of Search .................................. 356/349, 358, 356/361

[56] References Cited

U.S. PATENT DOCUMENTS

| | | | |
|---|---|---|---|
| 3,458,259 | 7/1969 | Bagley et al. | 356/106 |
| 3,656,853 | 4/1972 | Bagley et al. | 356/106 |

(List continued on next page.)

FOREIGN PATENT DOCUMENTS

| | | |
|---|---|---|
| 0 359 157 A2 | 3/1990 | European Pat. Off. . |
| 0 401 799 | 12/1990 | European Pat. Off. . |
| 2 309 698 | 9/1974 | Germany . |
| 5-126520 | 5/1993 | Japan . |
| 2 201 256 | 8/1988 | United Kingdom . |
| 2 210 973 | 6/1989 | United Kingdom . |
| WO 95/19541 | 7/1995 | WIPO . |

OTHER PUBLICATIONS

International Search Report for PCT/US97/16987 issued Jan. 22, 1998.

Baldwin, R. et al., "Laser Optical Components for Machine Tool and Other Calibrations", *Hewlett–Packard J.*, 14–22 (Apr. 1983).

Dukes et al., "A Two–Hundred–Food Yardstick with Graduations Every Microinch", *Hewlett–Packard J.*, vol. 21, 203–209 (1970).

Earnshaw, K.B. and Hernandez, N., "Two–Laser Optical Distance–Measuring Instrument that Corrects for the Atmospheric Index of Refraction," *Applied Optics*, vol. 11, No. 4, 749–54 (Apr. 1972).

(List continued on next page.)

*Primary Examiner*—Robert H. Kim
*Assistant Examiner*—Andrew H. Lee
*Attorney, Agent, or Firm*—Thomas J. Engellenner; Nutter, McClennen & Fish, LLP

[57] ABSTRACT

An improved interferometer measuring system that corrects for errors in the determination of the position of a measurement reflector along a measurement path due to the presence of an atmosphere (e.g. atmospheric turbulence) along the path is disclosed. The system includes a two-wavelength interferometer for measuring the atmosphere and a basic length interferometer for a basic measurement of a change in position of the measurement reflector. A calibration procedure for correcting the basic measurements made by the basic length interferometer uses first and second correction coefficients related to the average refractivity of the atmosphere and the change in the refractivity of the atmosphere, respectively. The coefficients can be determined by interferometric measurements or from a combination of interferometric measurements and data from an atmospheric sensor(s), including a humidity sensor. The two-wavelength interferometer can include a pulsed laser source, a compact reference path element, and path length adjustment element. An algorithm is disclosed for efficiently determining the phase difference between the two beams of the two-wavelength interferometer. Beam combining techniques and apparatus for combining the beams of the two-wavelength interferometer and the basic length measurement interferometer while preserving the polarization of the laser beams are also disclosed. The data obtained from the two-wavelength interferometer can be corrected, based on measurements made by the basic length interferometer, for aging due to the movement of the reflecting mirror subsequent to measurement of the atmosphere by the two-wavelength interferometer.

40 Claims, 14 Drawing Sheets

U.S. PATENT DOCUMENTS

| | | |
|---|---|---|
| 3,788,746 | 1/1974 | Baldwin et al. ............... 356/106 |
| 3,790,284 | 2/1974 | Baldwin ......................... 356/106 |
| 3,877,813 | 4/1975 | Hayes et al. ................. 356/106 R |
| 4,072,422 | 2/1978 | Tanaka et al. ................ 356/106 |
| 4,215,938 | 8/1980 | Farrand et al. ............... 356/358 |
| 4,295,741 | 10/1981 | Palma et al. ................. 356/349 |
| 4,465,372 | 8/1984 | Geary ............................ 356/359 |
| 4,594,003 | 6/1986 | Sommargren ................. 356/349 |
| 4,632,554 | 12/1986 | Pearce .......................... 356/349 |
| 4,684,828 | 8/1987 | Sommargren ................. 307/425 |
| 4,688,940 | 8/1987 | Sommargren et al. ........ 356/349 |
| 4,693,605 | 9/1987 | Sommargren ................. 356/349 |
| 4,711,574 | 12/1987 | Baldwin ........................ 356/349 |
| 4,717,250 | 1/1988 | Sommargren ................. 356/349 |
| 4,733,967 | 3/1988 | Sommargren ................. 356/361 |
| 4,746,216 | 5/1988 | Sommargren ................. 356/349 |
| 4,752,133 | 6/1988 | Sommargren ................. 356/349 |
| 4,784,489 | 11/1988 | Cutler et al. .................. 356/349 |
| 4,784,490 | 11/1988 | Wayne ........................... 356/351 |
| 4,787,747 | 11/1988 | Sommargren et al. ........ 356/349 |
| 4,802,764 | 2/1989 | Young et al. .................. 356/349 |
| 4,802,765 | 2/1989 | Young et al. .................. 356/349 |
| 4,807,997 | 2/1989 | Sommargren ................. 356/349 |
| 4,832,489 | 5/1989 | Wyant et al. .................. 356/359 |
| 4,859,066 | 8/1989 | Sommargren ................. 356/349 |
| 4,881,815 | 11/1989 | Sommargren ................. 356/349 |
| 4,881,816 | 11/1989 | Zanoi ............................ 356/349 |
| 4,883,357 | 11/1989 | Zanoi et al. ................... 356/349 |
| 4,886,363 | 12/1989 | Jungquist ...................... 356/349 |
| 4,906,095 | 3/1990 | Johnston ....................... 356/349 |
| 4,907,886 | 3/1990 | Dandliker ..................... 356/349 |
| 4,930,894 | 6/1990 | Baldwin ........................ 356/351 |
| 4,948,254 | 8/1990 | Ishida ........................... 356/358 |
| 4,950,078 | 8/1990 | Sommargren ................. 356/349 |
| 4,969,017 | 11/1990 | Lefevre et al. ................ 356/350 |
| 4,984,898 | 1/1991 | Höfler et al. .................. 356/358 |
| 5,004,914 | 4/1991 | Vali et al. ................. 298/227.27 |
| 5,127,735 | 7/1992 | Pitt ................................ 356/358 |
| 5,133,599 | 7/1992 | Sommargren ................. 356/349 |
| 5,146,284 | 9/1992 | Tabarelli et al. .............. 356/345 |
| 5,153,669 | 10/1992 | DeGroot ....................... 356/349 |
| 5,172,185 | 12/1992 | Leuchs et al. ................. 356/358 |
| 5,172,186 | 12/1992 | Hosoe ........................... 356/358 |
| 5,187,543 | 2/1993 | Ebert ............................. 356/349 |
| 5,280,341 | 1/1994 | Nonnenmacher et al. .... 356/358 |
| 5,394,413 | 2/1995 | Zayhowski ...................... 372/10 |
| 5,404,222 | 4/1995 | Lis ................................ 356/349 |
| 5,537,209 | 7/1996 | Lis ................................ 356/349 |
| 5,543,914 | 8/1996 | Henshaw et al. ............. 356/345 |
| 5,585,922 | 12/1996 | Sueyoshi ....................... 356/358 |
| 5,748,317 | 5/1998 | Maris et al. ................... 356/357 |

OTHER PUBLICATIONS

Hopf, F.A. et al., "Second–harmonic Interferometers", *Optics Letters,* vol. 5, 487–489 (1980).

Ishida, A., "Two–Wavelength Displacement–Measuring Interferometer Using Second–Harmonic Light to Eliminate Air–Turbulence–Induced Errors," *Japanese Journal of Applied Physics,* vol. 28, No. 3, L473–475 (1989).

Johnson et al., "Phase–Locked Interferometry", *Clever Optics, SPIE Proc.,* vol. 126, 152–160 (1977).

Lin, Y. and Pan, C., "Precision displacement measurement by active laser heterodyne interferometry" *Applied Optics,* vol. 30, No. 13, 1648–1652 (1991).

Quenelle, R. and Wuerz, L., "A New Microcumputer–Controlled Laser Dimensional Measurement and Analysis System", *Hewlett–Packard J.,* 3–13 (Apr. 1983).

Siddal, G. and Baldwin, R., Martinus Nijhoff publication *Optical Metrology* (*Coherent and Incoherent Optics for Metrology, Sensing and Control in Science, Industry and Biomedicine*) "Some Recent Developments in Laser Interferometry" (Olivérivo D.D. Soares, Porto, Portgual, eds.), published in cooperation with NATO Scientific Affairs Div., 69–83 (1987).

Surrel, Y., "Design of Algorithms for Phase Measurements by the use of Phase Stepping," *Applied Optics,* vol. 35, No. 1, 51–60 (Jan. 1, 1996).

Zayhowski, J.J., "Ultraviolet Generation with Passively Q–switched Microchip Lasers," *Optics Letters,* vol. No. 8, 588–90 Apr. 15, 1996).

TRANSMISSION

FIG. 6B  REFLECTION

INTERFEROMETER WITH AIR TURBULENCE COMPENSATION

This application claims priority under 35 U.S.C. 119(e) to co-pending U.S. provisional application Ser. No. 60/026,428, filed Sep. 20, 1996, the contents of which are hereby incorporated by reference.

BACKGROUND OF THE INVENTION

This application claims priority under 35 U.S.C. 119(e) to co-pending U.S. provisional application Ser. No.60/026,428, filed Sep. 20, 1996, the contents of which are hereby incorporated by reference.

This invention relates generally to interferometers. More particularly, it relates to methods and apparatus for improving the accuracy of interferometric measurements.

In optical interferometry, two optical beams are compared by combining the beams on a detector that detects the interference between the beams. Typically, coherent reference and measurement beams are directed along a constant length reference path and a measurement path, respectively. Changes in the length of the measurement path are precisely determined by detecting the interference and hence the change in optical phase between the two beams. Accordingly, interferometers have many industrial uses, such as positioning wafers for the production of integrated circuits, positioning substrates for flat panel displays, and positioning cutting tools for high precision machining.

Over the last decade or so, interferometers have played an increasingly important role in integrated circuit fabrication. Typically, an integrated circuit substrate is affixed to a movable stage to which a reflective mirror is attached. A positioning tool, such as lithographic stepper, positions the stage underneath a high performance image projection system. An interferometer is used to sense the position of the mirror, and hence the stage, to control the position of the stepper.

The potential precision with which interferometers can provide such position control has been significantly enhanced, to approximately the nanometer range, by technical advances in the design of various optical components, including lasers and photosensors, and in processing electronics. However, the manufacture of smaller, more advanced circuits will likely require sub-nanometer precision. Unfortunately, several important sources of error in the interferometric measurements remain, which in practice prevent the achievement of nanometer resolution. These errors include atmospheric disturbances, such as air turbulence in the measurement path; non-linear errors due to crosstalk between the measurement path and the reference path; and cosine errors introduced by any tilts of the stage mirror. Atmospheric disturbances can be controlled along the reference path by enclosing the portion of the interferometer which includes the reference mirror in a vacuum chamber. However, enclosing the entire system in a vacuum chamber, or otherwise providing a stable and known atmospheric environment for the entire system, is expensive and problematic.

Prior art systems have also attempted to compensate for fluctuations in optical path length due to atmospheric fluctuations. For example, the change of index of refraction of air with wavelength has long been known and characterized by researchers such as Edlen. See Edlen, "The Refractive Index of Air", *Metrologia,* 2:71–80, (1965), herein incorporated by reference. Earnshaw has proposed the use of two wavelengths to characterize the amount of air present in the measurement beam path as a means for measuring air turbulence for surveying applications. See Earnshaw, et al., "Two-Laser Optical Distance-Measuring Instrument that Corrects for the Atmospheric Index of Refraction", *Applied Optics,* 11:749–754, (1972), herein incorporated by reference. However, practical difficulties with implementing a high performance interferometer at a second wavelength in addition to the conventional HeNe wavelength of 633 nm have prevented straightforward application of the two-wavelength method.

A Second Harmonic Interferometer (SHI), originally described by Hopf, et al., has also been identified as a means for measuring air turbulence. See Hopf, et al, "Second-harmonic interferometers", *Optics Letters,* 5:386–388, (1980), herein incorporated by reference. An SHI projects two phase-locked beams at widely separated wavelengths along the optical measurement path. The shorter wavelength beam falls behind the longer wavelength beam in phase due to the increased refractivity of air at shorter wavelengths. This phase difference is directly proportional to a correction term that can be added to a basic length measurement made with an optical measurement system such as a heterodyne interferometer. Typically, the SHI uses a first frequency doubler to generate the second beam from a first beam generated by a CW laser, and a second frequency doubler to double the first beam, after the first and second beams have both traveled the measurement path, such that the phase difference between the two beams is more readily detected. For several reasons, however, no practical implementation of an SHI system has been developed to enable measurement with nanometer accuracy of the effects of air in the path to and from a moving stage mirror.

Frequency doubling a CW laser is not efficient, and often very little second harmonic radiation is obtained, limiting the SHI system signal-to-noise ratio and hence the accuracy of the measurement. Design compromises to compensate for the low signal-to-noise ratio lead to further errors in the measurement of the correction term for air. For example, focusing lenses, placed around the frequency doubling modules to increase the doubling efficiency, introduce at least three significant sources of error into the SHI measurement. First, thermal drifts in glass elements differ for the two wavelengths. Second, angular variations in the position of the stage mirror couple with the lenses to produce errors. As the stage tilts, the beams travel through different parts of the lens aperture. Wavefront errors in the lenses due to fractional wavelength departures from a completely achromatic design introduce a phase shift between the two-wavelengths used-in the second harmonic interferometer. Finally, the lenses can amplify angular variations in the beams as they travel through the second frequency doubler. The effect of these errors is to introduce a variable phase shift between the two wavelengths which is indistinguishable from that caused by the air turbulence in the path. Averaging the data to improve the signal to noise ratio is problematic when measuring a moving stage mirror as is typical during the measurement period.

SHI systems also have unique data processing requirements for determining the phase of the SHI signal. Typically, "1/f" noise is reduced in an interferometer by modulating one of the beams to introduce a frequency shift of between about 2 and about 20 MHz between the beams. The Doppler frequency shift in the beat frequency of the beams, due to the movement of the stage mirror, is detected. However, using these techniques in an SHI typically requires that either the fundamental beam or the second harmonic beam is modulated. Practical modulators have a low efficiency, and thus a significant loss is introduced into either the very small amount of second harmonic light, or the remaining fundamental light, where the effect of the loss is squared during the second frequency doubling process. Alternatively, a phase dither can be imparted to one of the SHI beams. The data processing to analyze the effects of this dither to determine the phase difference between the two beams usually incorporates averaging techniques to compensate for the low system signal to noise ratio. Averaging the data samples creates a lag in the value of the correction due to data age, and introduces errors when the stage is moving.

Finally, a CW laser source with sufficient power to create a detectable amount of second harmonic light is typically rather large, requiring that many of the system elements be placed away from the measurement path, leading to "dead-path" errors.

Accordingly, it is an object of the present invention to provide improved apparatus and methods for reducing the error in interferometric measurements caused by the presence of an atmosphere along the measurement path of the interferometer system It is another object of the present invention to provide an improved interferometer system for determining the effects of an atmosphere present along a measurement path.

SUMMARY OF THE INVENTION

The foregoing and other objects are achieved, in accordance with one aspect of the invention, by incorporating a pulsed laser into a two-wavelength interferometer system, such as second harmonic interferometer (SHI) system, for characterizing the atmosphere along a measurement path.

Other workers in the field, such as Matsumoto and Lis, have focused instead on the use of a CW laser for the second harmonic subsystem. See Lis "Air Turbulence Compensated Interferometer for IC Manufacturing," *Proc. SPIE* 2440, 1995, and Matsumoto, U.S. Pat. No. 5,394,240, both of which are herein incorporated by reference. Some efforts have been directed to using the same laser for both the basic length measurement and the second harmonic subsystem. See for example, U.S. Pat. Nos. 4,948,253 and 4,948.254, issued to Ishida, and Ishida, "Two-Wavelength Displacement-Measuring Interferometer Using Second-Harmonic Light to Eliminate Air-Turbulence-Induced Errors," *Japanese Journal of Applied Physics* 28:L473–475, 1989, both of which are herein incorporated by reference.

Pulsed lasers have not been considered as a light source for metrology for a variety of reasons, including a short coherence length, pulse-to-pulse variations in the laser pulse energy, and a low pulse repetition frequency compared to the measurement rate typically required. However, according to the present invention, a pulsed laser source is well-suited to the requirements of a second harmonic interferometer. The pulsed laser provides much higher doubling efficiency, resulting in a higher system signal to noise performance. Because the path length difference due to air is small, approximately 100 microns, the short coherence length laser can be tolerated. The path length difference varies slowly compared to the variation in the total distance to the stage mirror, thus, a lower sample rate, compatible with available laser pulse repetition frequencies, can be used to track the phase difference between the two beams of the two-wavelength interferometer.

According to another aspect of the present invention, an algorithm adapted to the two-wavelength interferometer allows the determination of the phase difference from a small number of samples of the interference pattern between the two-wavelength interferometer beams, so as to improve the data rate of the two-wavelength interferometer. One of the two-wavelength interferometer beams is periodically modulated, and a signal processor, responsive to the modulator of the beam, samples the detected interference signal and performs the operations according to the algorithm.

According to yet another aspect of the present invention, a compact reference path reduces the effect of pulse to pulse variations in the two-wavelength interferometer laser. The use of a reference path cancels residual errors due to factors such as variations over time in components in the beam path.

In a further aspect of the present invention, optical path length compensation is employed to aid in the use of a short coherence length laser to obtain high resolution air turbulence measurements. An optical path compensation apparatus adjusts the relative path lengths traveled by the beams of the two-wavelength interferometer to compensate for the frequency spread of the pulsed laser radiation.

According to another feature of the present invention, the number of two-wavelength interferometer focusing and beam diameter conversion optical elements is significantly reduced, improving accuracy of metrology and improving signal to noise performance. For example, focusing lenses for the harmonic doublers, can be either low power or possibly eliminated altogether.

According to another aspect of the present invention, a pulsed laser is used in two-wavelength interferometer subsystem for characterizing the air along a measurement path and a CW laser is used for a basic length measurement subsystem for measuring positional changes along the measurement path.

According to still another aspect of the present invention, an SHI subsystem and a CW basic length measurement interferometer system are combined, into a composite measurement system and the outputs of a two-wavelength subsystem and the basic length measurement subsystem are linked together to enable total system performance at the one nanometer level.

Further features of the present invention for improving the accuracy of the composite system include performing a system calibration to account for the effects of local atmospheric conditions, including humidity, the use of the stage velocity as measured by the basic length measuring subsystem to correct for aging of the air turbulence data measured by the second harmonic subsystem and eliminating non-linear errors in a heterodyne length measuring system.

In yet an additional aspect of the present invention, interferometric measurements made by a BLM interferometer are corrected for error due to the humidity of air along a measurement path.

For example, humidity sensor data can be incorporated in the calibration procedure for the interferometer.

The overall performance enhancement due the above aspects and features of the present invention also allows characterization and calibration of additional sources of error heretofore not easily measured, such as the non-linear errors due to polarization cross talk in a heterodyne basic length measuring system.

Additionally, accurate measurements of tilt, which can be made once the effects of air turbulence are eliminated, allow dynamic stage tilts during stage motion to be reduced, eliminating a source of error in the basic length measuring subsystem.

In another aspect of the invention, interferometric measurements with a composite system are made at a fixed stage position to determine a correction coefficient used to calibrate for atmospheric conditions, including humidity.

It is well-known that most optical coatings induce a differential phase shift between the s- and p-polarization states of transmitted and reflected light beams This effect can introduce error in many laser systems, including laser interferometers. Accordingly, in one aspect of the present invention, two successive optical surfaces are oriented so that the polarization component which is incident upon the first coating as s-polarization is incident on the second coated surface as a p-polarization, and vice versa In this way, the differential phase change induced by the two coatings is equal and opposite, resulting in a net differential phase change of zero. This technique can be applied to both transmitted and reflected beams. In another aspect of the invention, this technique is incorporated into a dichroic beamsplitter for combining the beam of a SHI and the BLM to travel the measurement path.

In yet another aspect of the invention, interferometric measurements are made at a fixed stage position to determine a correction coefficient related to the change in the refractivity of the air in the measurement path. An additional correction coefficient related to the average refractivity of the air in the measurement path is determined based on data from at least one atmospheric sensor or from interferometric measurements made of a change in stage position and averaged over time. The correction coefficients are then combined with an uncorrected determination by the BLM system to correct measurements made by the BLM system for error due to air turbulence. The two-wavelength interferometer can incorporate a pulsed laser or a CW laser.

BRIEF DESCRIPTION OF THE DRAWINGS

The foregoing and other objects, features and advantages of the invention will be apparent from the following description and from the accompanying drawings, in which like reference characters refer to the same parts throughout the different views. The drawings illustrate principles of the invention and, although not to scale, show relative dimensions.

FIG. 6B shows the disposition of two optical elements to compensate for the differential phase shift introduced to the s-polarization and p-polarization components of a beam reflected by the two elements.

DETAILED DESCRIPTION OF THE ILLUSTRATED EMBODIMENTS

Figure 1:
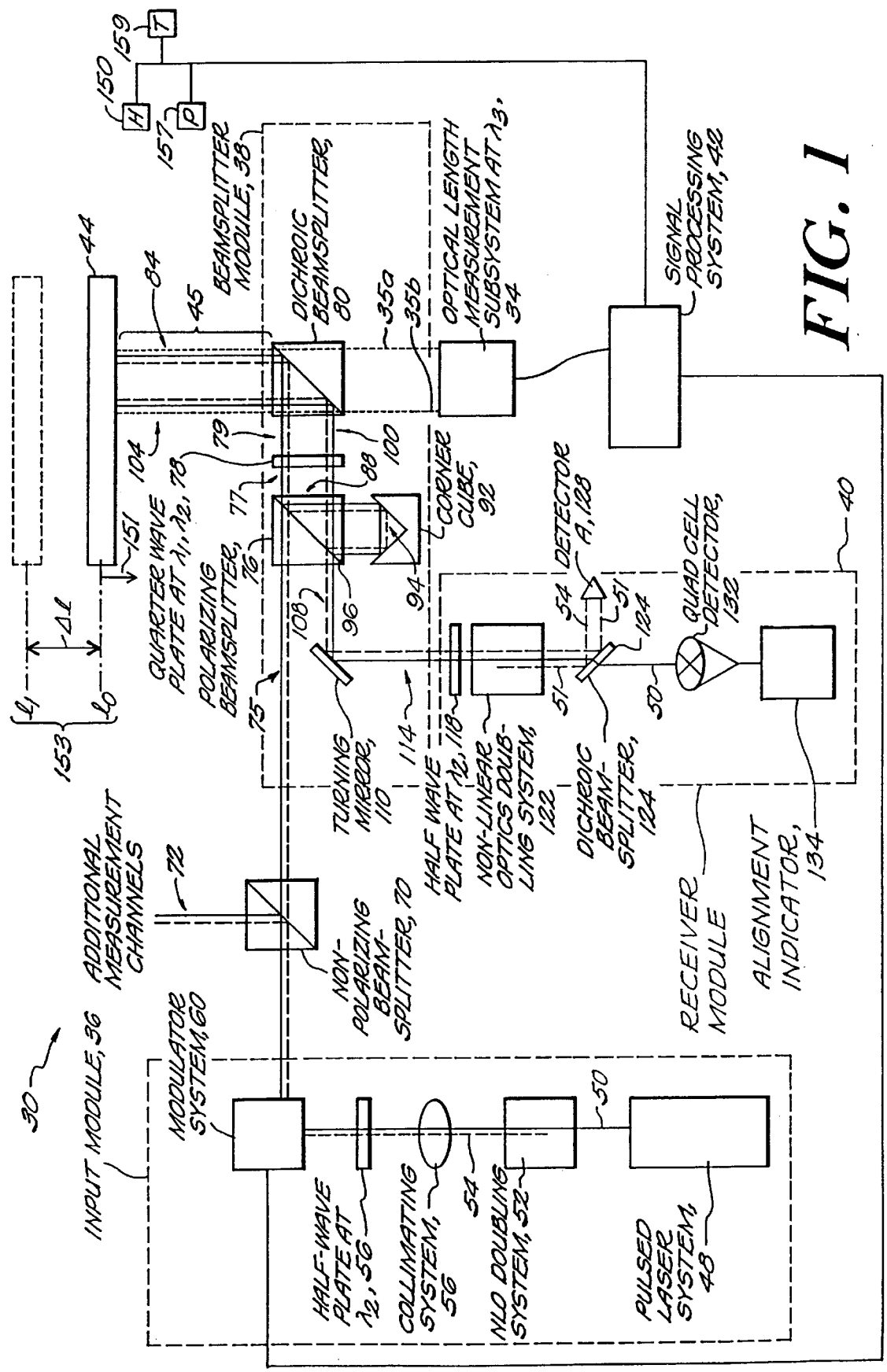
FIG. 1 is a schematic view of one illustrated embodiment of an air turbulence compensated interferometer (ATCI) that includes a basic length measurement (BLM) subsystem and a second harmonic interferometer (SHI) subsystem.

FIG. 1 is a schematic diagram of a preferred embodiment of a composite interferometer measuring system, or Atmospheric Turbulence Compensated Interferometer (ATCI), 30 that compensates for air turbulence. The composite interferometer system 30 includes two subsystems: a second harmonic interferometer (SHI) subsystem 32 for measuring the air turbulence along a measurement path 45; and a basic length measurement (BLM) subsystem 34 for making basic, uncorrected measurements of changes in the position of a measurement reflector, or mirror, 44 along the measurement path 45. The SHI subsystem 32 includes an input module 36, a beamsplitter module 38, a receiver module 40, and a signal processing system 42.

The present invention includes several features, as is evident to one of ordinary skill from the description that follows of the operation of the ATCI system 30. These features include (1) a pulsed laser for producing the two beams used by the SHI subsystem 32; (2) an optical path length compensator, conveniently combined with an optical phase modulator, for compensating for the typically poor frequency stability of the pulsed laser of the SHI subsystem 32; (3) a reference path element for removing sources of error internal to the SHI subsystem 32; (4) an efficient signal processing technique, which uses as few as five laser pulses from the pulsed laser to calculate the effects of air (e.g. air turbulence) in the measurement path 45, thereby increasing the data rate of the SHI subsystem 32; and (5) the synergistic use of the output signals from the SHI subsystem 32 and the BLM subsystem 34, allowing a) the removal of error in the measurement made by BLM subsystem 34 due to air turbulence, and b) because of the increased measurement accuracy attendant the removal of such error, the removal of other significant errors from the BLM measurement as well.

Referring to FIG. 1, the SHI subsystem 32 includes a pulsed laser source 48 for producing a beam of radiation 50 at a wavelength $\lambda_1$. One example of a suitable laser source 48 is a diode-pumped, passive Q-switched laser, such as described by Zayhowski. See Zayhowski "Ultraviolet Generation With Passively Q-Switched Microchip Lasers", *Optics Letters*, 21:588–590 (1996), herein incorporated by reference. One of ordinary skill in the art, in light of the disclosure herein, will appreciates that other examples of a suitable laser source 48 can include an active Q-switched laser and a mode-locked laser. Upon exit from the laser source 48, the beam 50 is typically polarized perpendicular to the plane of the drawing. A first frequency doubling system 52 receives the beam 50 and generates, typically via a non-linear optical crystal, a second beam 54, having a wavelength 2, that is phase locked and collinear with the $\lambda_1$ beam 50. The frequency doubling system typically does not require focusing lenses, which introduce into the beams 50 and 54 phase errors that are indistinguishable from the phase difference between the two beams caused by atmospheric turbulence. Many different non-linear materials are suitable for generating the second beam 54, including, but not limited to, crystals of beta barium borate, of potassium dihydrogen phosphate, and of periodically poled materials, such as lithium niobate. The length of material used in the frequency doubling system 54 can be relatively short, such as on the order of 1 mm.

Figure 2:
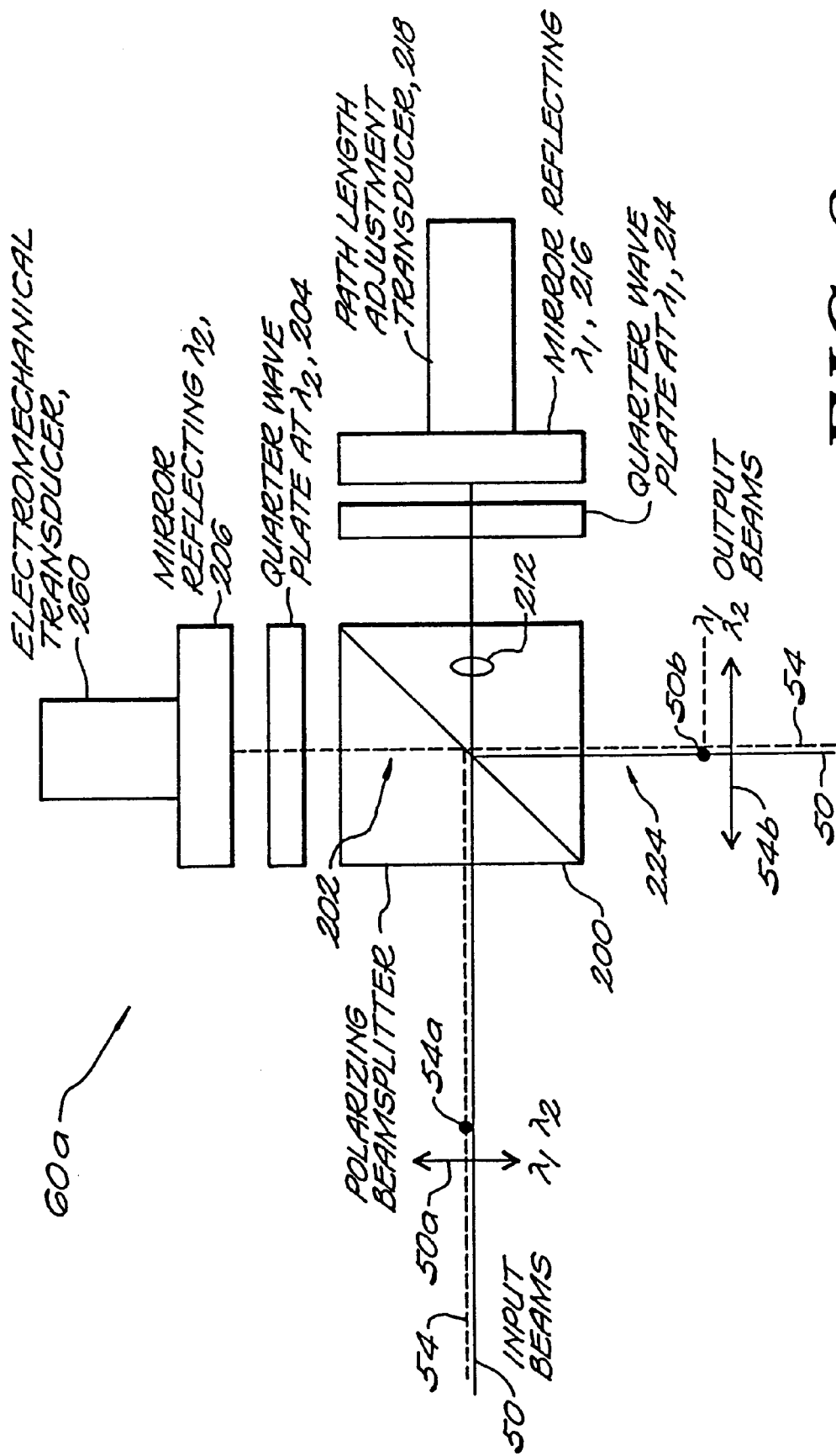
FIG. 2 is a schematic view of a modulator for modulating one of the two laser beams of the SHI subsystem of FIG. 1, and including compensation apparatus for varying the optical path length traveled by one of the beams.
Figure 3:
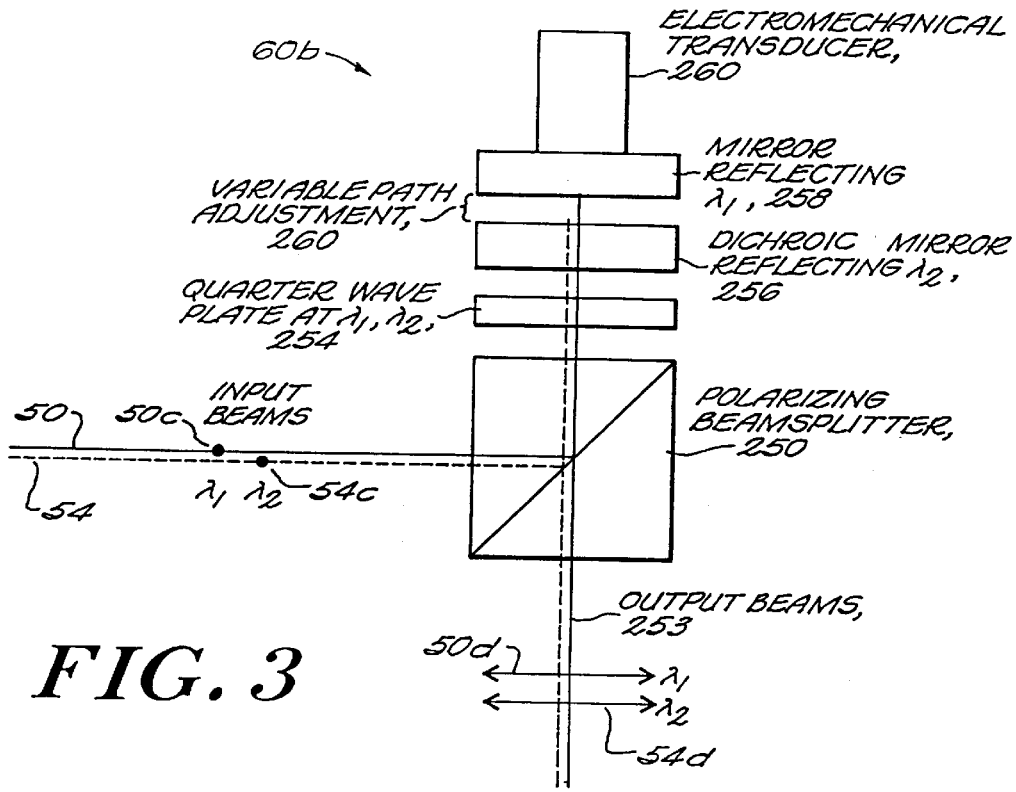
FIG. 3 is a schematic view of an alternative embodiment of the modulator for use in the system of FIG. 1.

The beams 50 and 54 exiting the frequency doubling system 52 are phase-locked, with the beam 54 at $\lambda_2$ having a polarization orthogonal, or cross-polarized, to the $\lambda_1$ beam 50. An achromatic lens system 56 collimates the beams 50 and 54 and an optical phase modulator 60 imparts a phase dither either to the $\lambda_1$ beam 50 or to the $\lambda_2$ beam 54. A preferred embodiment 60A of the modulator 60, shown in FIG. 2, accepts the cross-polarized beams 50 and 54 exiting the collimating system 56. An alternative embodiment 60B of the modulator 60 can use co-polarized input beams 50 and 54, and is shown in FIG. 3. To co-polarize the beams 50 and 54 for use with the modulator 60b, the half-wave plate 58 can be inserted in the path of the beams 50 and 54, as shown in FIG. 1. If the modulator embodiment 60A is used with composite system 30, the half-wave plate 58 is placed after the modulator 60, to ensure that the polarization of the beams 50 and 54 exiting the input module 36 are parallel, as they are upon exit from the alternate modulator embodiment 60B shown in FIG. 3. Both embodiments of the modulator 60 rotate the plane of polarization of both the beams 50 and 54 by 90°, and both can incorporate an optical compensation path length feature to equalize the total system path length of the beams 50 and 54, which have wavelength $\lambda_1$ and $\lambda_2$, respectively. The embodiments of the phase modulator 60 shown in FIGS. 2 and 3 and the path length compensation feature are subsequently discussed in more detail below.

Upon exit from the beams 50 and 54 from the input module 36, an optional, non-polarization sensitive beamsplitter 70 may be inserted in the path of the two beams 50 and 54 to provide optical radiation for measurement of the air turbulence along additional paths, such as path 72.

Figure 4:
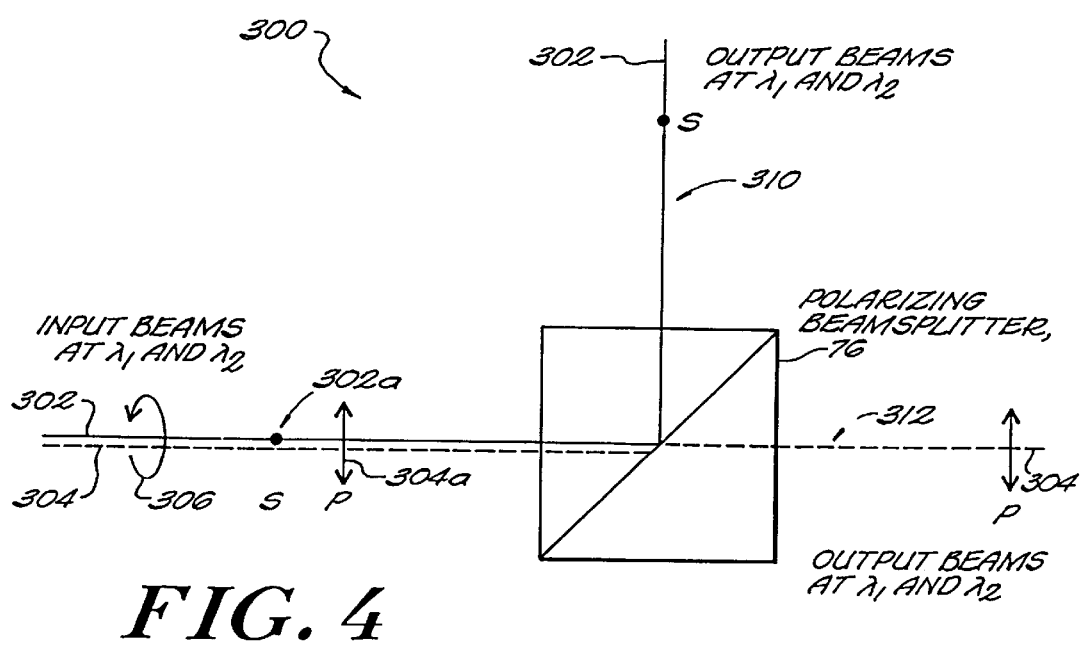
FIG. 4 illustrates the principle of operation of a two-wavelength polarizing beamsplitter for use in the beamsplitter module of the SHI subsystem of FIG. 1.

The two beams 50 and 54 next enter the beamsplitter module 38 and, traveling along the path 75 as p-polarized beams, are transmitted by the two-wavelength polarizing beamsplitter 76. As shown in FIG. 4, the polarizing beamsplitter 76 operates at the $\lambda_1$ wavelength of beam 50 and at the $\lambda_2$ wavelength of beam 54 to transmit p-polarization and reflect s-polarization. For example, with reference to FIG. 4, the incident beam 302 represents an s-polarized beam, as indicated by the dot 302a, having a wavelength of either $\lambda_1$ or $\lambda_2$. The two-wavelength polarizing beamsplitter 76 reflects the s-polarized beam 302 such that it travels along the path 310. The beam 304 is a p-polarized beam, as indicated by the arrow 304a, having a wavelength of either $\lambda_1$ or $\lambda_2$. The beamsplitter 76 transmits the beam 304 to travel along path 312. As appreciated by one of ordinary skill in the art, possessed of the disclosure therein, the polarizing beamsplitter 76 can be fabricated using standard thin film coating techniques.

Referring again to FIG. 1, a $\lambda_1$ and $\lambda_2$ quarterwave plate 78 receives and circularly polarizes the plane-polarized beams 50 and 54 exiting the polarizing beamsplitter 76.

Next, a dichroic beamsplitter 80 reflects the beams 50 and 54 towards the section 84 of the measurement path 45, and further transmits a beam 35a at a wave length $\lambda_3$ supplied by the BLM subsystem 34. The BLM subsystem 34 can be of a type known as a heterodyne interferometer. The beams 50, 54 and 35a, now collinear, travel the path 84 of the measurement path 45 and are reflected from a plane mirror 44 attached to the object, such as a the stage of a lithographic stepper, (not shown) whose position is to be measured. This reflection converts right hand circular polarization to left hand polarization, and vice versa. After reflection, the beams 35a, 50 and 54 retravel the measurement path 84 to be returned to the dichroic beamsplitter 80. The dichroic beamsplitter 80 transmits the reflected $\lambda_3$ beam 35a back to the BLM subsystem 34. The beams 50 and 54 are returned to the polarizing beamsplitter 76, making a second pass through the quarter wave plate 78, which converts the circular polarization into linear s-polarization.

Next, the polarizing beamsplitter 76 reflects the now s-polarized beams 50 and 54 along path 88 towards the corner cube 92. The corner cube 92 reflects the beams such that they travel along paths 94 and 96. As shown, path 96 is parallel to, but displaced from, the incident path 88. The polarizing beamsplitter 76 again reflects the beams 50 and 54 such that they pass through the quarter wave plate 78 and become circularly polarized, traveling path 100, and the dichroic beamsplitter 80 reflects the beams 50 and 54 and transmits a $\lambda_3$ beam 35b, such that all three beams travel colinearly along section 104 of the measurement path 45 to the plane mirror 44.

The plane mirror 44 reflects the $\lambda_1$ beam 50 and the $\lambda_2$ beam 54 to retravel path 104 to dichroic beamsplitter 80 where they are reflected to travel path 100, and pass again through the quarter wave plate 78, which converts the beams to p-polarization. The beamsplitter 76 passes the now p-polarized beams 50 and 54 along the path 108. The dichroic beamsplitter 80 transmits the beam 35a reflected from the mirror 44 back to the BLM subsystem. Because of the action of the corner cube 92, the path portion 108 traveled by the beams 50 and 54 as they exit the polarizing beamsplitter 76 is displaced from the path portion 75, and a turning mirror 110 can be disposed to direct the beams 50 and 54 towards a second frequency-doubler 122.

As described above, the ATCI system 30 is configured so that the optical beams 50, 54 and 35 make a double pass to the plane mirror 44. The first pass of beam 35 is indicated by reference numeral 35a, and the second by reference numeral 35b. As described above, the corner cube 92 directs the beams 50 and 54 such that they are collinear with the beam 35b and travel the portion 104 of the measurement path 45. (The reference numeral 35 is used herein to refer generally to the $\lambda_3$ beam radiated by the BLM subsystem.)

The beams 50 and 54 now enter the receiver module 40. A $\lambda_2$ half-wave plate 118 converts the beam 54 to s-polarization before the beam enters the second frequency-doubler 112. The second frequency doubles converts a portion of the $\lambda_1$ beam 50 to an s-polarized beam 51 at wavelength $\lambda_2$. There are now two beams having a wavelength of $\lambda_2$: the beam 51, which has been converted from the beam 50, and the beam 54. A dichroic beamsplitter 124 transmits the $\lambda_1$ beam 50 and reflects the two beams 51 and 54 at wavelength of $\lambda_2$ to a detector 128, where they interfere. The phase of the interference between these two beams provides a signal which is proportional to the amount of air in the measurement path 45. An error term can be derived from this phase value to correct for the amount of error, or path length change caused by air, in a measurement made by the BLM subsystem using the $\lambda_3$ beam 35.

In the ATCI system 30 described above, the dichroic element 80 transmits the beams 35a and 35b from the BLM subsystem 34 and reflects the beams 50 and 54 of the SHI subsystem 32. It will be obvious to one of ordinary skill in the art, possessed of the teachings herein, that, alternatively, the system 30 can be arranged such that the dichroic element 80 reflects the BLM subsystem beam 35 and transmits the SHI subsystem beams 50 and 54.

A quad cell detector 132 and an alignment indicator 134 allow alignment of the optical components of the SHI subsystem using the beam 50 that is transmitted by the dichroic beamsplitter 124.

As described in more detail below, a signal processor 42 performs operations to determine correction coefficients and to correct the uncorrected measurements made by the BLM subsystem 34 for error due to air in the measurement path 45. The signal processor receives input from both the detector 128 of the receiver module 40 of the SHI system 32 and from the BLM subsystem 34. The signal processor 42 may also be in electrical communication with the phase modulator 60 and with atmosphere sensors, such as a humidity sensor 150, a temperature sensor 159, and a pressure sensor 157, disposed so as to measure, as practically as appropriate, the atmosphere present along the measurement path 45. The sensors 150, 157 and 159 can be used to determine the average refractivity of the air along the measurement path 45. Alternatively, interferometric measurements may be used to determine the average refractivity as is discussed below.

For ease of explanation and illustration, the beams 50, 54 and 35 are schematically shown in the FIG. 1 as traveling paths slightly displaced from each other. However, the beams are typically colinear. As noted in the text, the beams can be deliberately separated for purposes of such as separate detection, beamsplitting etc. As is understood by one of ordinary skill, in light of the disclosure herein, it is advantageous, though not necessary, that the beams colinearly travel the measurement path, as well as other paths is the system.

The optical phase modulator 60 can modulate either the beam 50 or the beam 54 of FIG. 1 to facilitate detection of the phase between the beams by the signal processor 42. Referring to FIG. 2, showing a preferred embodiment 60A of the phase modulator 60, the beams 50 and 54 are incident on a polarizing beamsplitter 200, which can be of the same type as the beamsplitter 76 of the beamsplitter module 38 shown in, and discussed in conjunction with, FIG. 1. Because the beams 50 and 54 entering the polarizing beamsplitter 200 are cross-polarized, as indicated by the arrow 50a and the dot 54a, indicating a polarization direction in the plane of the page (p-polarization) and out of the plane of the page (s-polarization), respectively, the beamsplitter 200 separates the beams. The beamsplitter 200 reflects the s-polarized beam 54 such that it travels path 202, passes through the quarter wave plate 204, reflects from the mirror 206, and passes again through the quarter wave plate 204, to be transmitted by the beamsplitter 200 along exit path 224. The beam 54 is transmitted through the beamsplitter 200, rather than reflected, because the double pass through the quarter wave plate 204 and the reflection from the mirror 206 have changed the polarization of beam 54 from s-polarization to p-polarization. The periodically vibrating mirror 206, driven by a transducer device 210 such as an electrostrictive modulator available from Queensgate, imparts a periodic phase dither to the beam 54.

Similarly, the beamsplitter 200 transmits the s-polarized beam 50, indicated by a solid line, such that it passes through the quarter wave plate 214, reflects from the reflecting mirror 216, is transmitted again by the quarter waveplate plate 214, and, now p-polarized, is reflected by the beamsplitter 200 along the exit path 224. As the beams 50 and 54 exit the modulator 60A, they are cross-polarized, but with polarizations 50b and 54b, orthogonal to their original polarizations 50a and 54a.

A mechanical translation stage 218 mounts the mirror 216 for adjusting the relative path lengths of the two beams 50 and 54 travel as they are projected about the SHI subsystem 32 described in FIG. 1. The relative path length is adjusted with translation stage 218 to compensate for the frequency spread of the beams 50 and 54.

As evident to one of ordinary skill in the art, based on the disclosure herein, the proper adjustment of the translation stage can be determined, with a sufficient accuracy, through calculation of the indices of refraction, dispersion and the thickness of the system optics, such as the components shown in FIG. 1, at the wavelengths $\lambda_1$ of the beam 50 and at the wavelength $\lambda_2$ of the beam 54. Combination of the path length adjustment feature with the modulator 60 is advantageous because the beams are already separated by the modulator 60a so as to impart a phase dither to one of the beams. The path length adjustment feature of the present invention allows the use of lasers with a much shorter coherence length, and poor pulse to pulse frequency stability, such as can be typical of the pulsed laser 48. As is evident to one of ordinary skill in the art in light of the above discussion, the mirror 216 can be fixed in position, and the translation transducer 218 can alternatively mount the reflecting mirror 206 and electromechanical transducer 210 for translation thereof.

FIG. 3 shows an alternative embodiment 60b of the modulator 60 of FIG. 1. The beams 50 and 54 the enter the modulator 60a co-polarized, and having s-polarization relative to the beamsplitter 250, as indicated by reference numerals 50c and 54c. The beams 50 and 54 also exit the modulator co-polarized, but with their polarizations each rotated by 90 degrees to p-polarization relative to the beamsplitter 250, as indicated by reference numerals 50d and 54d. Reflection of the beams 50 and 54 from the mirrors 258 and 256, respectively, in conjunction with a double pass through the quarter wave plate 254, converts s-polarization to p-polarization such that the beams 50 and 54 are transmitted by the beamsplitter 250 and exit toward the bottom of FIG. 3, along path 253. The dichroic mirror 256 reflects the beam 54 and transmits the beam 50 to reflect from the mirror 258. The electromechanical transducer 260 drives the mirror 258 to impart a periodic phase dither to the beam 50 reflected from the mirror 258. An adjustment means, not shown, but readily implemented by one of ordinary skill in the art in light of the disclosure herein, can adjust the distance 260 between the mirrors 256 and 258 to adjust the relative path length traveled by the beams 50 and 54.

Figure 5:
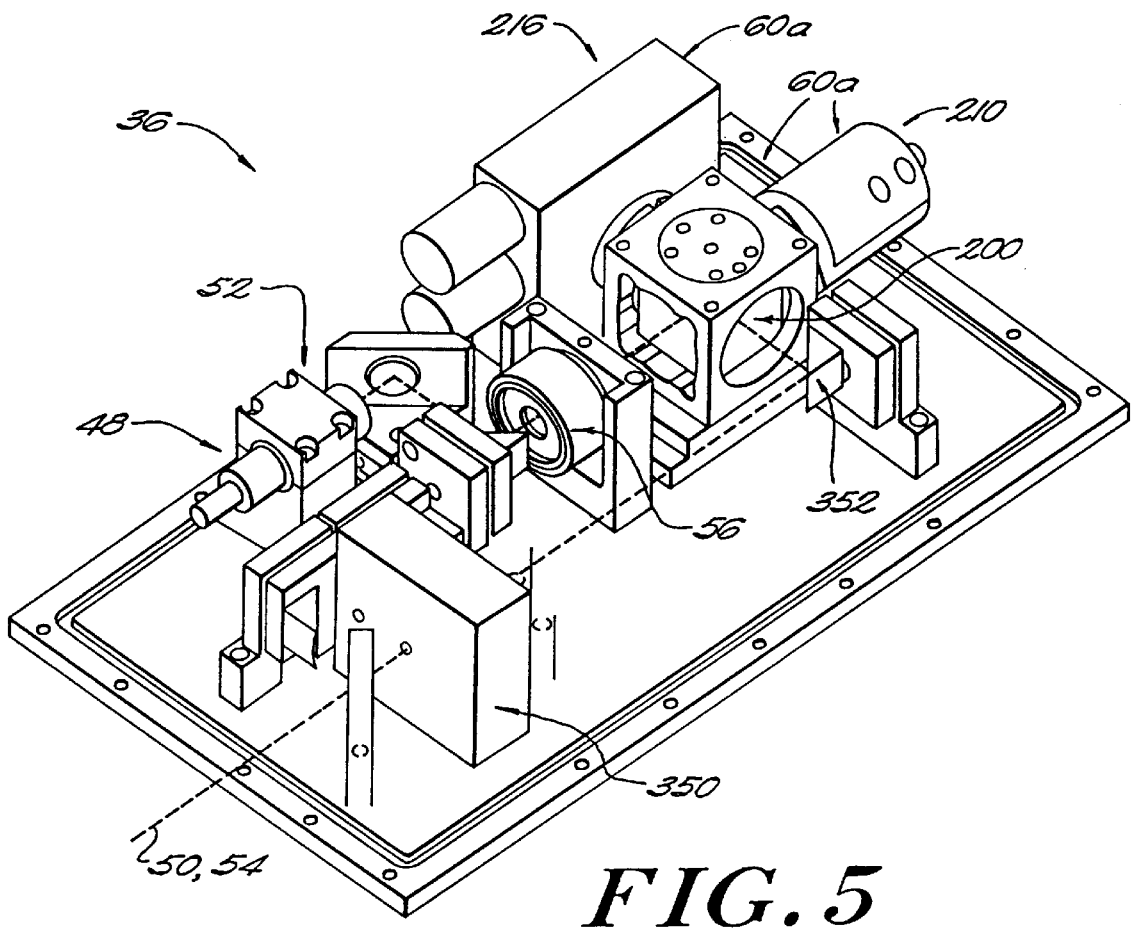
FIG. 5 shows an isometric view of one embodiment of an input module of the SHI subsystem of FIG. 1, including a passive Q-switched pulsed laser, collimation optics, and a compact modulator element.

FIG. 5 shows an isometric view of one embodiment of an input module 36, showing the pulsed laser 48, the doubler 52, the collimating system 56, a modulator 60a, including the reflecting mirror 216 for reflecting the beam 50, the electromechanical transducer 210 for imparting the periodic phase dither to the beam 54, and the polarizing beamsplitter 200. A turning mirror 352 reflects the beams 50 and 54 to a laser shutter 350, from which the beams 50 and 54 exit the input module 36.

The beamsplitter module 38 of FIG. 1 combines the beams 35a and 35b from the BLM measurement subsystem 34 and the beam 50 and 54 from the SHI subsystem 32. As evident to one of ordinary skill from the discussion above, particularly regarding the polarizing beamsplitter 76, polarization is used to control the paths of the various optical beams 50, 54 and 35a and 35b. Accordingly, the dichroic optical coatings typically used by the beamsplitter 80, which combines the BLM $\lambda_3$ beam 35 with the SHI beams 50 and 54, should minimally affect the polarization of those beams.

In analyzing the interaction of a optical beam incident upon a surface with that surface, the beam is typically resolved into s- and p-polarization components relative to the surface. The s- and p- polarization designations describe two linear polarization states which are perpendicular and parallel, respectively, to the plane of incidence of the beam upon the optical surface. As is known by those of ordinary skill in the art, most optical coatings induce a differential phase shift between the s- and p-polarization components of a beams transmitted or reflected from the optical coating.

Such a differential phase shift, if introduced, for example, by the dichroic coating of the beamsplitter 80, will likely result in an increase in error in the determination by the SHI subsystem 32 of the effects of atmospheric turbulence in the measurement path 45.

Figure 6A:
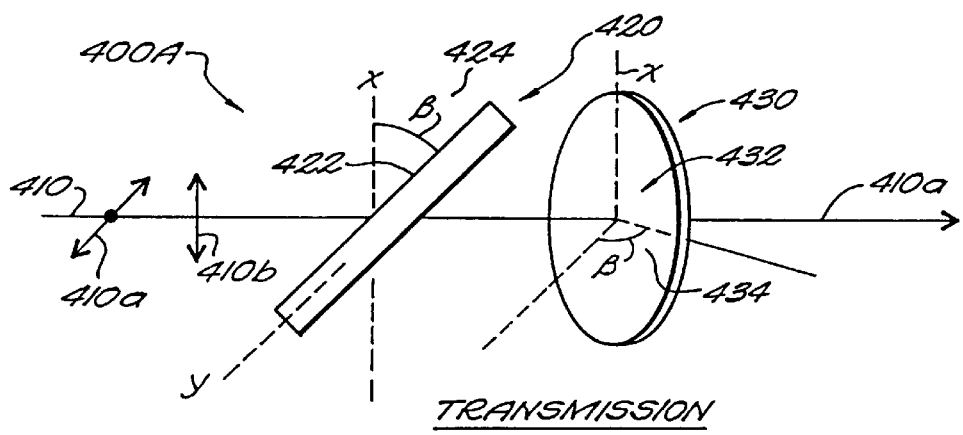
FIG. 6A shows the disposition of two optical elements to compensate for the differential phase shift introduced to the s-polarization and p-polarization components of beam transmitted by the two elements.

FIGS. 6A and 6B show techniques and apparatus, according to the invention, for compensating for this differential phase shift, in both the case of transmission through optical elements, as shown in FIG. 6A, or reflection from an optical element, as shown in FIG. 6B.

Referring to FIG. 6A, a beam of radiation 410 is incident upon two successive coated optical surfaces, 422 and 432, of the optical elements 420 and 430, respectively. The bean 410 has two polarization components, 410a and 410b. The polarization component 410a is incident upon the surface 422 as s-polarization, and the component 410b is incident thereon as p-polarization. Accordingly, a differential phase shift, which is a function of the angle 124, is introduced between the polarization components 410a and 410b. However, the second surface 422 is disposed such that the polarization 410a is incident thereon a p-polarization, and the polarization component 410b is incident thereon as s-polarization, the surface 432 being further disposed so as to form angle 434 with the polarization component 410a having the same magnitude β as the angle 424 formed by the surface 422 with the polarization component 410b. In summary, polarization component that is incident upon the first coated surface 422 as s-polarization is incident on the second coated surface 432 as a p-polarization, and vice versa, and the surfaces are disposed such that the angle formed by each surface with incident p polarization components are equal. In this way, the differential phase change induced by the two coatings 422 and 432 is equal and opposite, resulting in a net differential phase change of zero.

The case for a reflected beam is shown in FIG. 6B, showing the beam 410 incident and reflecting from coated optical surfaces 452 and 462 on optical elements 450 and 460 respectively. The polarization components 410a and 410b are incident upon the coated surface 452 as s-polarization and p-polarization, respectively, and beam 410 forms an angle 454 having magnitude P with the surface 452. Upon the surface 462, the components are interchanged, beam 410 again forming an angle 464, again having a magnitude β, with the surface 462. Accordingly, the differential phase shift between the s-polarization and p-polarization is minimized.

The techniques shown in FIGS. 6A and 6B will work best when the two optical surfaces 422 and 432, or 452 and 462, are optically identical. Optically identical, as used herein, means that the two surface are as identical as possible, or as identical as necessary to achieve a minimum phase cancellation for a given application. It is advantageous that the two surface be coated in same coating run. The techniques and apparatus of FIGS. 6A and 6B can be used over a wide range of incidence angles, in addition to the β=45 degree angle of incidence shown in FIGS. 6A and 6B. In addition, it is well-known that the differential phase shift introduced by a a coating is minimized when the angle of incidence of a beam directed to the surface approaches the normal to the surface. This is also a useful technique the reducing the differential phase shift.

Note that in FIGS. 6A and 6B the incident beam 410 is illustrated as having two orthogonal polarization components, 410a and 410b. As understood by one of ordinary skill in the art, in light of the disclosure herein, the foregoing discussion is general in nature, as many polarizations, including linear, circular and elliptical, of the incident beam 410 can be represented as a superposition two components, such as 410a and 410b. Thus the depiction of 410a and 410b in FIG. 6 is not limiting, but for illustrative purposes only.

Figure 7:
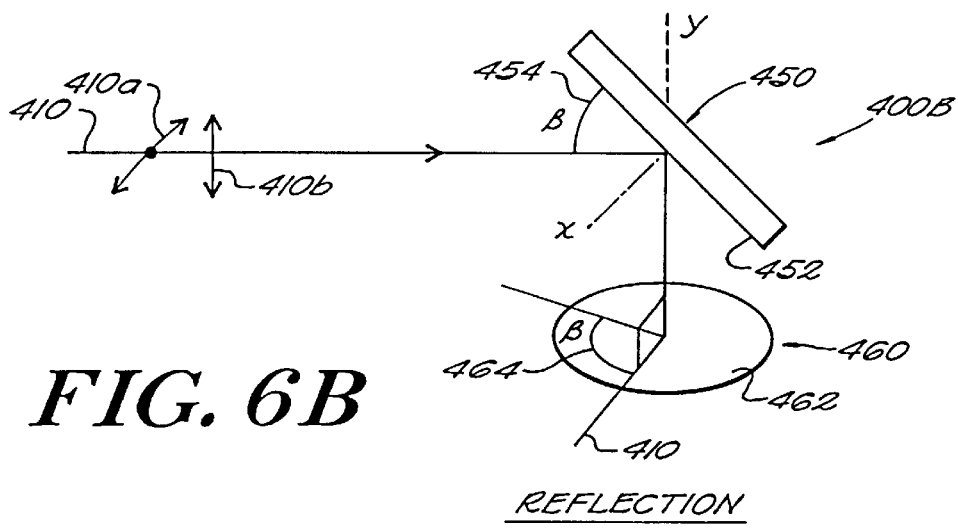
FIG. 7 shows a top view of a beamsplitter assembly for combining the optical beams of the BLM and SHI subsystems of FIG. 1, and incorporating techniques illustrated in FIG. 6A for minimizing the differential phase shift introduced into the SHI and BLM subsystem beams.
Figure 7:
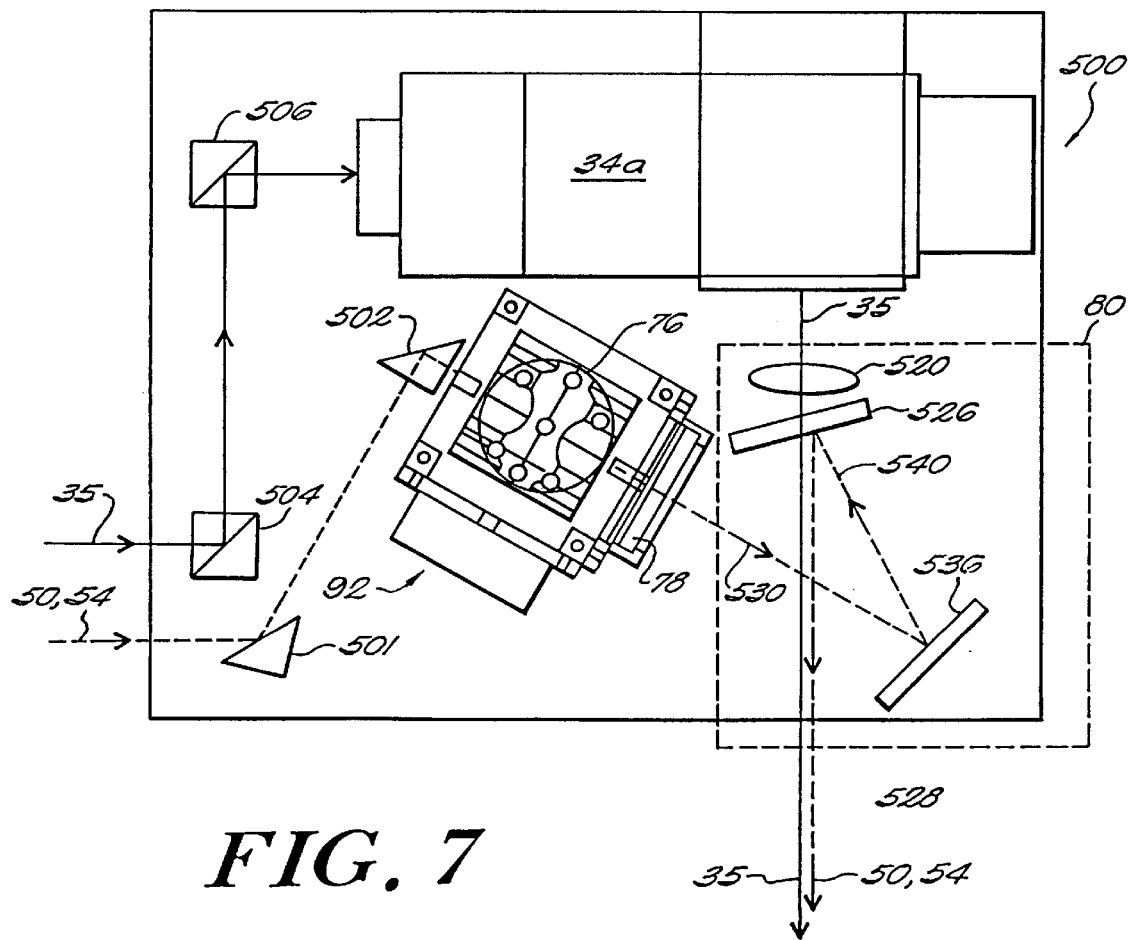

FIG. 7 shows a top view of one embodiment 500 of a beamsplitter module 38 of FIG. 1 that combines the circularly polarized SHI beams 50 and 54 with the BLM beam 35. The beamsplitter 500 transmits the BLM beam 35 through a first optical element 520 and a second therethrough, dichroic element 526, having identical optical coatings, to cancel the effect of differential phase shift on the beam 35. The beamsplitter 500 further reflects, at a low angle of incidence, the SHI beams and 50 and 54 from the second element 526 and a third element 536 to combine the beams 35, 50 and 54 and to direct them along the path 528 and towards the measurement path 45 in FIG. 1. The low angle of incidence of the beams 50 and 54 on the second and third elements 520 and 526 minimizes the differential phase shift in the beams 50 and 54. Typically, the SHI beams 50 and 54, are incident on the second and third optical elements at an angle of 15 degrees from the substrate normal to minimize the effect of differential phase shaft between the said p-polarization of each beam, thereby preserving the circular polarization of each beam. The beamsplitter 500 thus employs the technique shown in FIG. 6A for preserving the polarization of the beams 50 and 54.

Also shown in FIG. 7 are the following: turning mirrors 501 and 502 for directing the beams 50 and 54 to the polarizing beamsplitter 76; the corner cube 92; the quarter wave plate 78; and turning mirrors 504 and 506 for directing the beam 35 radiated by a laser source (not shown) to the BLM subsystem 34 for processing by the remainder 34a of the BLM subsystem 34.

The ATCI system 30 can advantageously include a reference path in the beamsplitter module 38 for removing internal system noise. Sources of this internal system noise can include the following: pulse to pulse variation of the laser energy radiated by the pulsed laser source 48, the effects of air turbulence paths traveled by the SHI beams 50 and 54 that are not traveled by the beam 35 of the BLM subsystem 34, thermal drifts in the optical elements that are common to the paths traveled by SHI beams 50 and 52 and the BLM beam 35; errors in the modulation waveform introduced by the modulator 60; and the effects of frequency instability in the laser source 48. A reference path can be formed by splitting of each of the SHI beams 50 and 54, at $\lambda_1$ and $\lambda_2$, respectively, into two separate beams. The use of a pulsed laser source 48 leads to efficient operation of the frequency doublers 52 and 122, such that light sufficient for a reference paths can be diverted from the measurement path 45 while still maintaining an adequate signal to noise ratio for measurement of the atmosphere present along the reference path 45.

Figure 8:
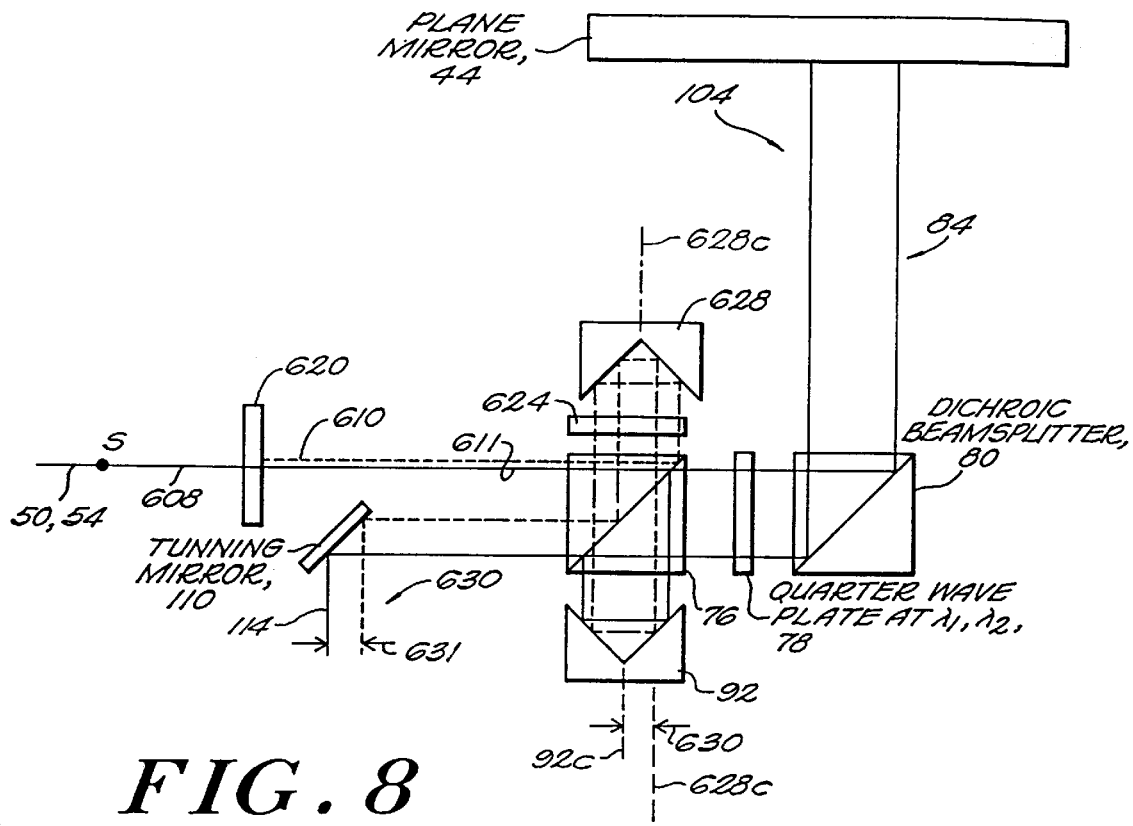
FIG. 8 shows one embodiment of apparatus for incorporating a reference path into the beamsplitter of the SHI subsystem of FIG. 1.
Figure 9:
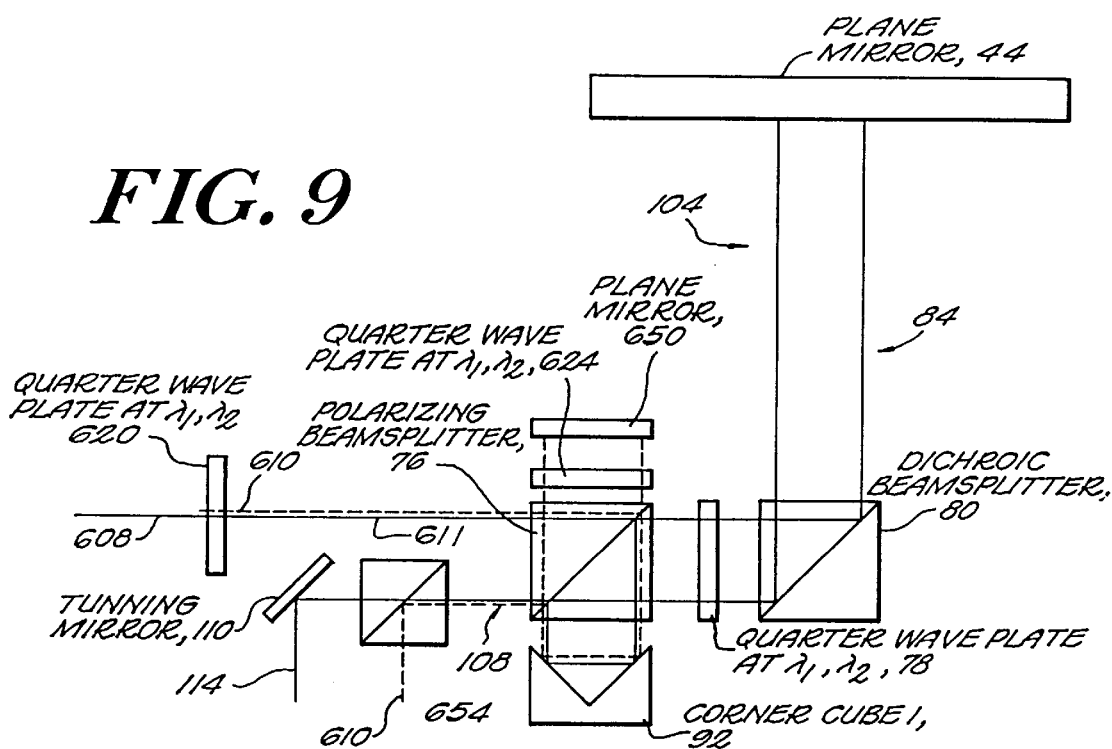
FIG. 9 shows an alternative embodiment of the reference path apparatus of FIG. 8.
Figure 10:
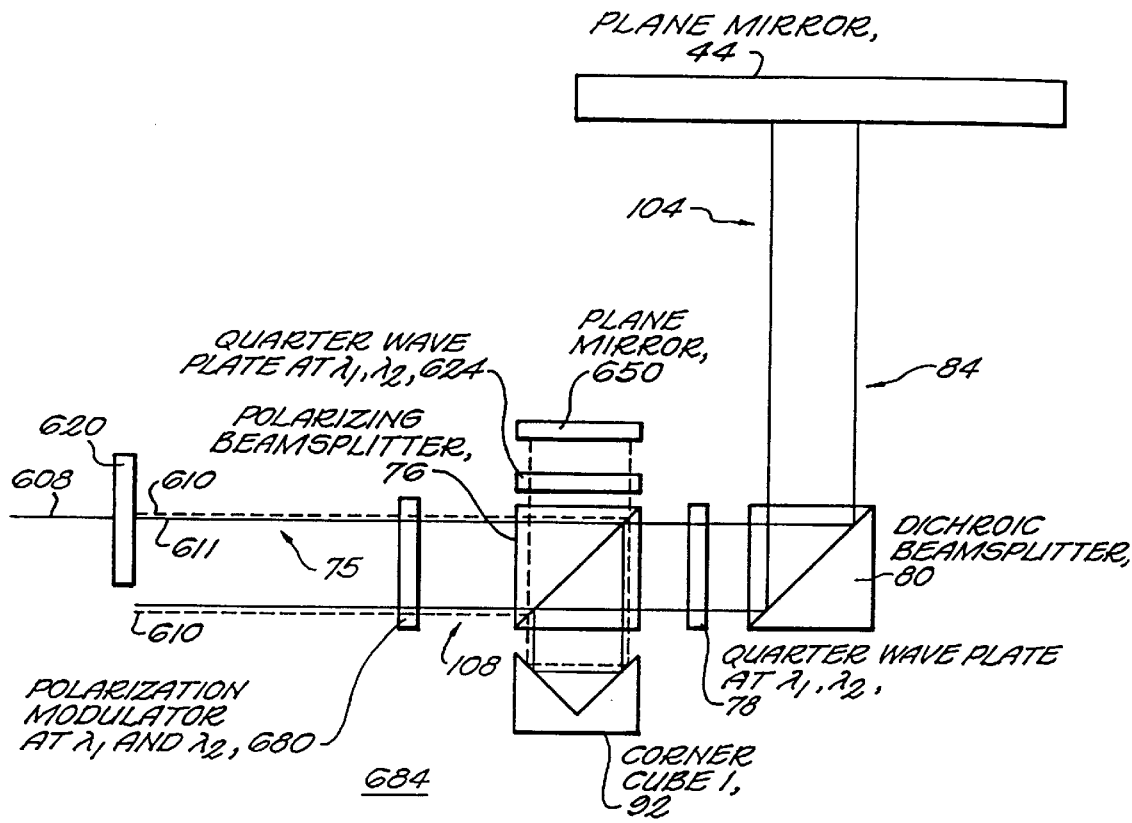
FIG. 10 shows another alternative embodiment of the reference path apparatus of FIGS. 8.

A reference beam can be separated from each of the beams 50 and 54 by the beamsplitter 76 such that the beams 50 and 54 can be properly directed to the measurement path 45, and such that reference beams can be directed into an optical detector separate from the measurement optical detector 128. Polarization is commonly used in the heterodyne interferometer BLM subsystem 34 to direct beams to measurement and reference paths, but only a single detector is typically required for the heterodyne interferometer. FIGS. 8, 9 and 10 show three embodiments that allow the reference beams to be created and directed to a detector separate from the measurement detector 128.

A preferred embodiment of a reference apparatus is shown in FIG. 8. Quarter wave plate 620 at both $\lambda_1$ and $\lambda_2$ splits each of the input beams 50 and 54, indicated by the solid line 608, into reference path beams, indicated by the dotted line 610, with which the measurement beams 50 and 54, indicated by reference numeral 611, are cross polarized. The measurement beams 611 are p-polarized and are transmitted through the polarizing beamsplitter 76 to the measurement path 45 and back, as described in FIG. 1. Note that in FIG. 1, the solid line of FIG. 1 represents the beam 50 and the dotted line the beam 54, whereas in FIG. 8, the dotted line represents the reference beams 610 split from both beams 50 and 54, and the solid line represents both measurement beams 50 and 54, indicated by reference numeral 611.

Referring again to FIG. 8, the reference beams 610 are s-polarized and reflect from the polarizing beamsplitter 76, pass through the quarter wave plate 624 and reflect from reference corner cube 628 to pass again through the quarter wave plate 624. The quarterwave plate 624 rotates the plane of polarization of the reference beams 610 so that they are transmitted to corner cube 92 and returned to the reference corner cube 628. When the reference beams 610 are re-reflected a second time by the reference corner cube 628, they are reflected from the polarizing beamsplitter 67 and reflected by the turning mirror 110 along path 630. The reference beams 610 are physically displaced, as indicated by reference numeral 631, from the measurement beams 611 reflected by the turning mirror 110 to travel path 114, because the center line 628c of the reference corner cube 628 is displaced from the center line 92c of the corner cube 92, as indicated by reference numeral 630. The displacement 631 allows the reference beam 610 and the measurement beam 611 to be processed and directed to separate measurement and reference detectors (not shown). A signal responsive to the detected reference beams is, as understood by one of ordinary skill in the art, in light of the disclosure herein, typically subtracted from the measurement signal responsive to the detected measurement beams 611.

One advantage of the apparatus of FIG. 8 is that a half wave plate at $\lambda_1$ and $\lambda_2$, (not shown) can be introduced into either the reference beams 610 or into the measurement beams 611 after the polarizing beamsplitter 76, to allow both the reference and measurement beams, 610 and 611 respectively, to use the same output frequency doubler, such as the doubler 122 of FIG. 1.

FIG. 9 describes another embodiment of an apparatus and method for providing reference beams. The reference corner cube 628 of FIG. 8 is replaced by a plane mirror 650. The corner cube 92 provides the same lateral displacement to both the reference beams 610 and the measurement beams 611, so that the beams 610 and 611 are collinear as they exit the beamsplitter 76 along the path 108. However, the measurement beams 611 and the reference beams 610 have orthogonal polarizations. Accordingly, a polarizing beamsplitter 654 directs the reference beams 610 for further processing. As one of ordinary skill will understand from the foregoing and following discussions, a $\lambda_1$ and $\lambda_2$ half wave plate can be used to rotate the polarizations of the reference beams 610, and, with proper beam directing optics, a single frequency doubler can be used for both the reference beams 610 and the measurement beams 611 prior to the beams being detected by detectors. Furthermore, the plane mirror 650 can be replaced with a corner cube.

A third embodiment of an apparatus and method for providing a reference, similar to that of FIG. 9, is shown in FIG. 10. The polarizing beamsplitter 654 of FIG. 9 is replaced by a polarization modulator 680 that operates at both $\lambda_1$ and $\lambda_2$, and is positioned to intercept both the measurement beams 611 and reference beams 610 along path 75, and the output measurement and reference beams along path 108. Separation of the measurement beams 611 from the reference beams 610 is accomplished temporally by the rotating the plane of polarization of the beam transmitted by the polarization modulator 680. When the polarization modulator 680 transmits s-polarization, the measurement beams 611 are directed to the measurement path 45 and interfered on a detector (not shown); when the polarization modulator transmits p-polarization, the reference beam 610 proceeds as described above and can be interfered on a detector (not shown). By appropriately rotating the plane of polarization of the output beam, as described above, the same frequency doubler and detector can be used for both the reference and measurement paths.

Various methods can be used to adjust the polarizations of the measurement and reference beams 611 and 610 before the beams, after traveling the measurement and reference path described in conjunction with the embodiments of FIGS. 8–10, are interfered on and detected by a detector or detectors. For example, a polarizing beamsplitter and turning mirror can be used to separate the two beams and direct them in parallel through a frequency-doubler crystal, such as the frequency-doubler 122 of FIG. 1. A half wave plate in one of the two beams can be used to rotate the plane of polarization so that both beams are polarized properly for the frequency-doubler crystal. Alternatively, the axis of preferred polarization for the doubler can be oriented at 45 degrees to the polarization of each beam. In this case, the output signal will be reduced by a factor of two, but fewer optical elements will be required.

Referring again to FIG. 1, the second frequency doubler 122 of the receiver module 40 of the SHI subsystem 32 is preferably carefully designed to avoid the introduction of error into measurements made by the SHI subsystem 32. These errors can be introduced by small tilts 151 of the plane mirror 44 attached to the object whose position is being measured. The tilts 151 can introduce at least two types of error, as shown in FIG. 11.

Figure 11A:
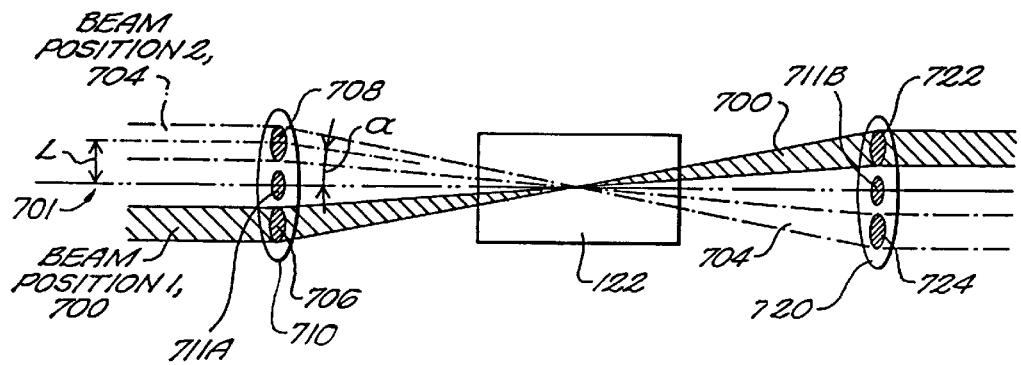
FIG. 11A illustrates one mechanism by which focusing lenses used with a frequency doubler can introduce error into measurements made by the SHI subsystem of FIG. 1.
Figure 11B:
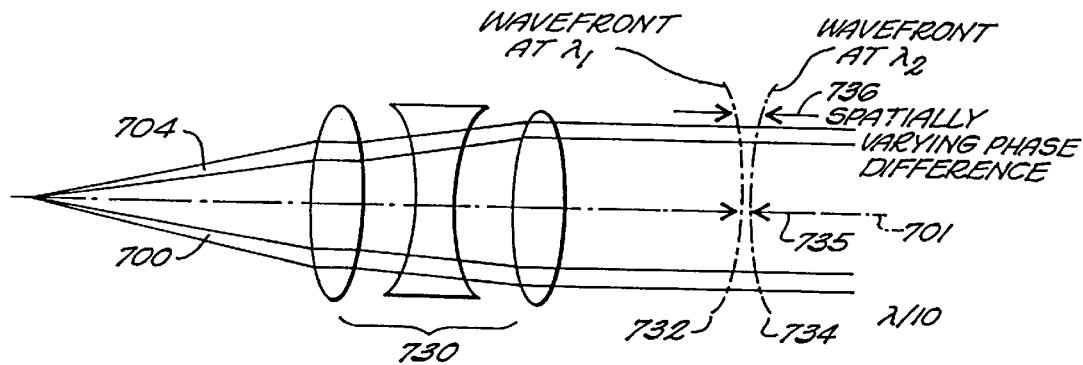
FIG. 11B illustrates another mechanism by which focusing lenses used with a frequency doubler can introduce error into measurements made by the SHI subsystem of FIG. 1.

For example, the combined effect of tilt of the stage mirror 44 and the processing of the beams 50 and 54 by the corner cube 92 of the beamsplitter module 38 introduces a lateral displacement of an optical beam entering and exiting focusing lenses, such as lenses 710 and 720, that can be used with the second frequency doubler crystal 122A, as shown in FIG. 11A. FIG. 11A shows two possible lateral displacements, 704 and 700, of a beam that preferably would enter the frequency doubler crystal 122A along the normal 701. As the location of a beam, such as beam 701, on the input aperture of the focusing lens 710 changes, the angle of the beam propagation through the frequency doubler crystal changes. For example, the input beam 701 is displaced such that it travel through the portion 708 of the lens 710 rather than the central portion 711A, and such that the displaced beam 701 propagates thorough the crystal 122A at an angle a from the normal 701. As is known in the art, achieving exact phase matching of the optical beams, (such as beams 50, 51 and 54 of FIG. 1) that travel through the crystal 122A of the frequency doubler 122 is very important. Propagation of optical beams at an improper angle is detrimental to the 30 desired exact phase matching of the optical beams. This angular sensitivity is a well-known property of both angle-tuned and temperature-tuned frequency doublers. The effect of a laterally displaced beam, such as beam 701, on the phase matching becomes worse as the focusing power of the lens 710 is increased, as the angular displacement a is increased for a given lateral displacement L of the beam 704 from the normal 701. Often the lens 701 is chosen to have as high a power as possible, so as to achieve the greatest possible focusing of the beam 704 in the frequency doubler crystal 122A, thereby achieving the greatest possible doubling efficiency.

Secondly, the laterally-displaced incident beam 704 passes through a different part of aperture of the focusing lenses 710 and 720 than a beam which is incident when the stage mirror is perfectly aligned. For example, the beam 704 passes through aperture portions 708 and 724 of lenses 710 and 720, respectively, rather than through aperture portions 711A and 711B, through which a non-displaced beam incident along the normal 701 would pass. Because at the lenses 710 and 720 are designed and fabricated for use at two widely-separated wavelengths, i.e. the wavelengths of the beams 50 and 54, the lenses do not perform identically at these two-wavelengths over the entire lens aperture. For example, with reference to FIG. 11B, assume that the beam 701 has a wavelength of $\lambda_1$, and that the beam 700 has a wavelength of $\lambda_2$, which is widely spaced from the wavelength $\lambda_1$. Although the beams 704 and 700 are typically collinear, they are shown as upwardly and downwardly displaced, respectively, in FIG. 11B for ease of illustration. The phase fronts 732 and 734, produced by the focusing lens system 730 for the wavelengths of $\lambda_1$ (beam 704) and $\lambda_2$ (beam 700) have a minimal separation 735 along the normal 701 and are more widely separated, as indicated by reference number 736, for beams 700 and 704 displaced from the normal 701. Accordingly, a variation in phase, which cannot be distinguished from the effects of atmospheric turbulence, is introduced between the beams 700 and 704.

Accordingly, the use of focusing lens elements, and especially high power focusing lens elements, with the frequency doubler 122 is preferably avoided. One significant benefit of the use of a pulsed laser source 48 is that the doubling efficiency of the doubler 122 is increased and the need for focusing lenses correspondingly decreased.

Figure 12:
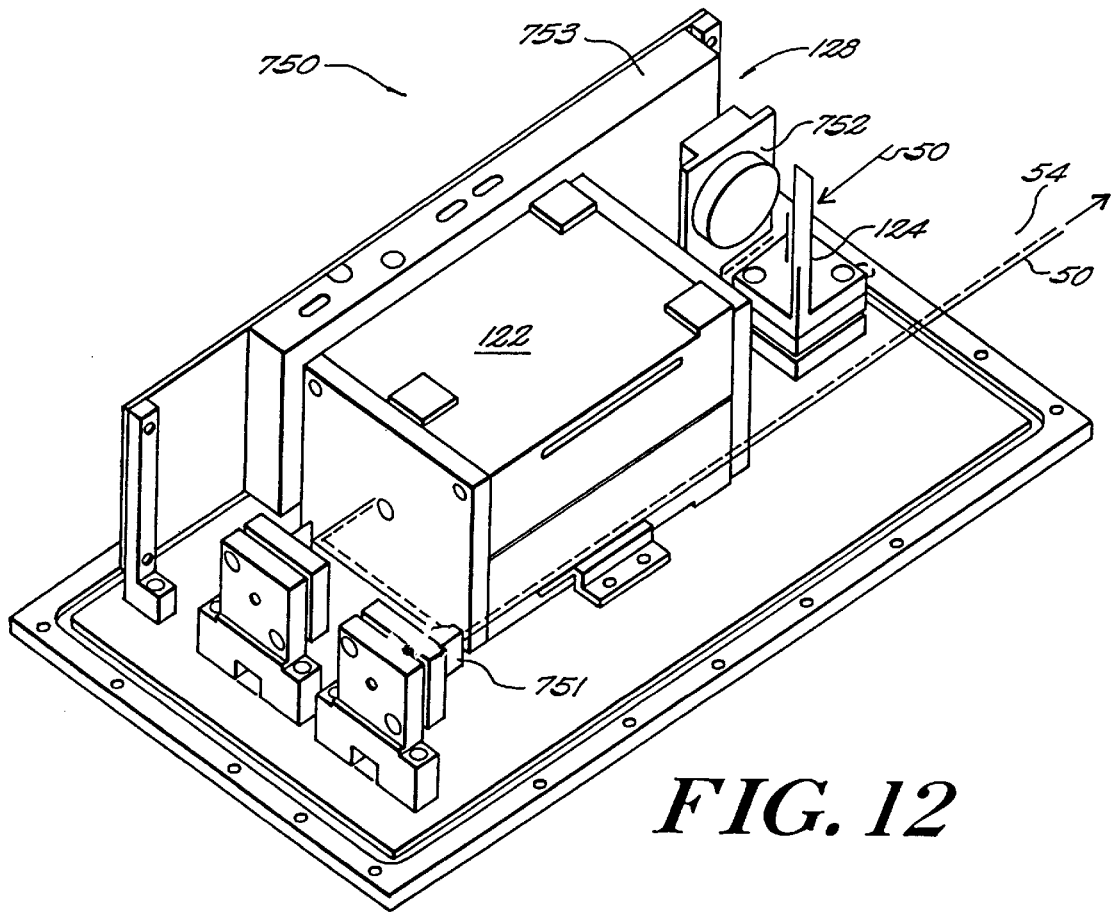
FIG. 12 shows an isometric view of one embodiment of a receiver assembly of the SHI subsystem of FIG. 1.

FIG. 12 shows an isometric view of one embodiment 750 of a receiver assembly 40 of FIG. 1. Turning mirrors, such as turning mirrors 751, direct the beams 50 and 54 to second doubler 122, which converts a portion of the beam 50 to a beam 51 (not shown). The dichroic beamsplitter 124 receives the beams 50, 51 and 54, reflecting the beams 51 and 54 and transmitting the beam 50 toward the quad cell detector 132 (not shown in FIG. 12) of FIG. 1. A filter assembly receives the reflected $\lambda_2$ beams 50 and 51, attenuating any remaining light at a wavelength $\lambda_1$. The beams 50 and 51 next interfere on the detector 128, which is integrated with a circuit board 753 that amplifies the signals from the detector.

A further improvement in the SHI subsystem 32 is an algorithm, typically part of the signal processing system 42 of FIG. 1, for determining the phase between the two $\lambda_2$ beams 50 and 51. This algorithm is particularly useful because it uses a small number of signal samples, and the measurement rate of the air turbulence by the SHI subsystem 32 is limited by the pulse rate of the pulsed laser. This algorithm provides additional advantages related to accurate measurement of the position of the plane mirror 44, which is typically moving during the measurement period. These advantages are obtained when the sampling times, equal to the times when the laser pulses occur, meet specific requirements. The algorithm can also be useful in applications using CW lasers.

Figure 13:
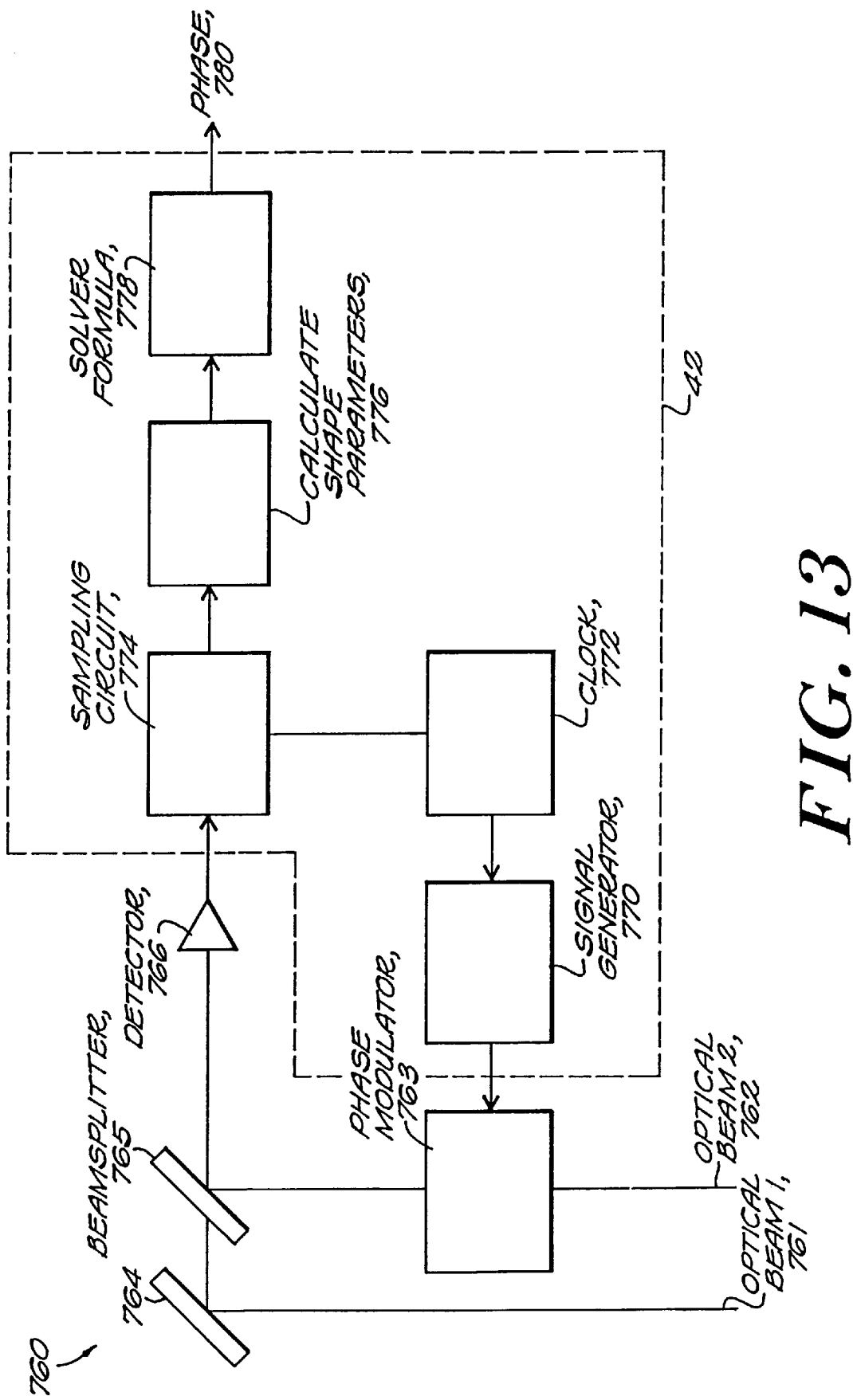
FIG. 13 is a schematic block diagram illustrating the operation of one embodiment of a signal processor and a phase modulator for determining the phase difference between two optical beams.
Figure 14A:
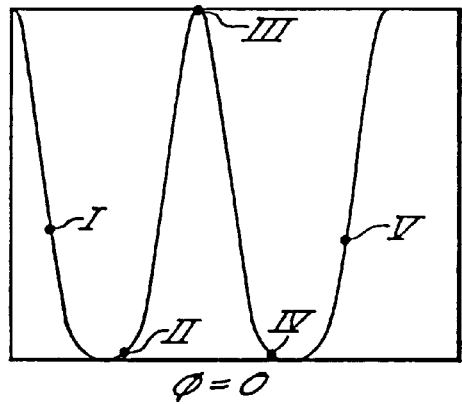
FIG. 14A illustrates the sampling of a detected interference waveform by the signal processor of FIG. 1 according to an algorithm for determining the phase difference between the beams of the SHI subsystem of FIG. 1, where the beams are in phase.
Figure 14B:
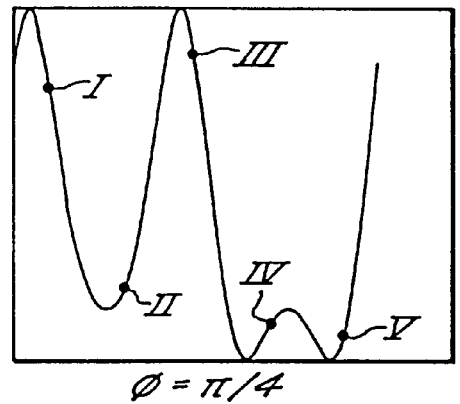
FIG. 14B illustrates the sampling of a detected interference waveform by the signal processor of FIG. 1 according to an algorithm for determining the phase difference between the beams of the SHI subsystem of FIG. 1, where the phase difference between the beams is $\pi/4$ radians.
Figure 14C:
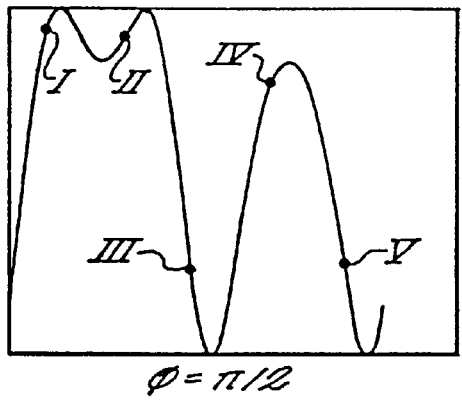
FIG. 14C illustrates the sampling of a detected interference waveform by the signal processor of FIG. 1 according to an algorithm for determining the phase difference between the beams of the SHI subsystem of FIG. 1, where the phase difference between the beams is $\pi/2$ radians.
Figure 14D:
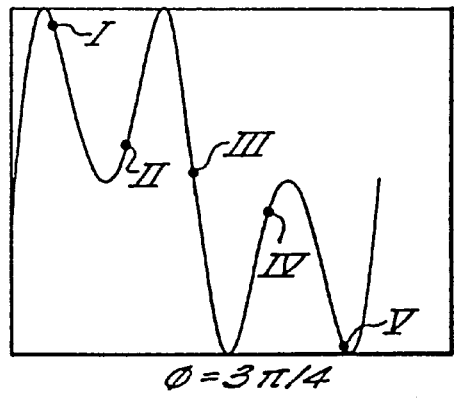
FIG. 14D illustrates the sampling of a detected interference waveform by the signal processor of FIG. 1 according to an algorithm for determining the phase difference between the beams of the SHI subsystem of FIG. 1, where the phase difference between the beams is $3\pi/4$ radians.
Figure 14E:
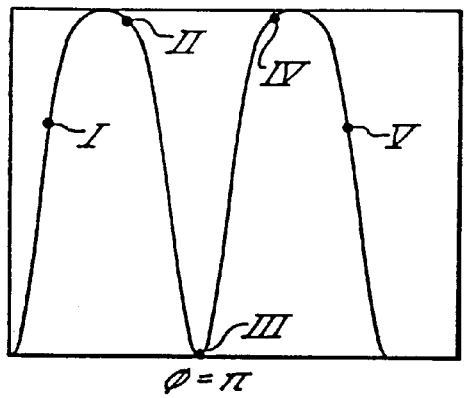
FIG. 14E illustrates the sampling of a detected interference waveform by the signal processor of FIG. 1 according to an algorithm for determining the phase difference between the beams of the SHI subsystem of FIG. 1, where the phase difference between the beams is $\pi$ radians.
Figure 14F:
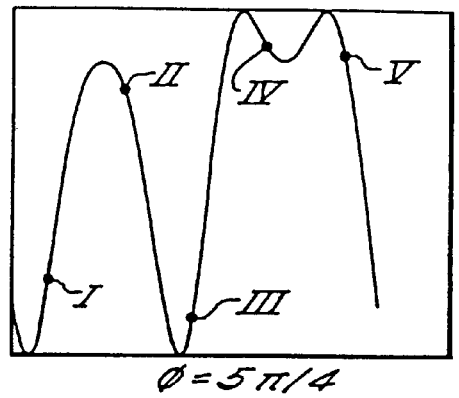
FIG. 14F illustrates the sampling of a detected interference waveform by the signal processor of FIG. 1 according to an algorithm for determining the phase difference between the beams of the SHI subsystem of FIG. 1, where the phase difference between the beams is $5\pi/4$ radians.
Figure 14G:
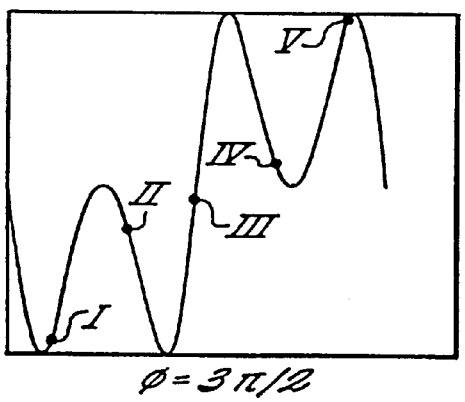
FIG. 14G illustrates the sampling of a detected interference waveform by the signal processor of FIG. 1 according to an algorithm for determining the phase difference between the beams of the SHI subsystem of FIG. 1, where the phase difference between the beams is $3\pi/2$ radians.
Figure 14H:
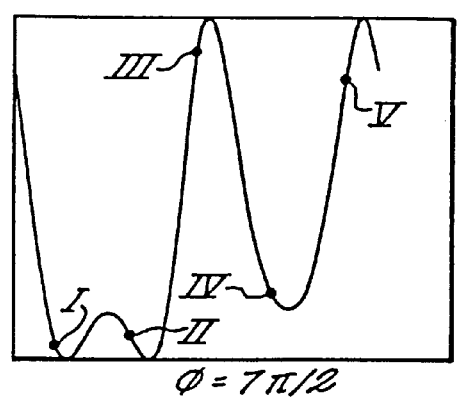
FIG. 14H illustrates the sampling of a detected interference waveform by the signal processor of FIG. 1 according to an algorithm for determining the phase difference between the beams of the SHI subsystem of FIG. 1, where the phase difference between the beams is $7\pi/4$ radians.

This analysis defines the algorithm used to determine the phase between the two coherent beams at wavelength $\lambda_2$ using five sample values. A flow chart of one implementation of this algorithm is shown in FIG. 13. A modulator periodically modulates, with a period P, an optical beam 762. Turning mirrors 764 and 765 direct the optical beam 761 and the now modulated beam 762, respectively, so as to interfere on a detector 766. A signal generator 770, responsive to a clock 772, drives the modulator 763, and a sampling circuit 774, also responsive to the clock 772, samples the interference signal from the detector 766 at the five appropriate times relative to the modulation period P of modulator 763 to obtain a set of five sample data points. The shape parameter element 776 calculates four shape parameters from the five sample data points, and the solver 778 yields the phase 780 between the optical beam 761 and 762. Typically, the signal generator 770, the clock 772, the sampling circuit 774, the shape parameter calculator 776, and the solver 778 are incorporated in the signal processor 42 of FIG. 1, and the phase modulator 763 is part of the phase modulator 60 of the SHI input module 36 of FIG. 1. The optical beams 761 and 762 can correspond to the SHI beams 50 and 51.

The phase modulator 783 modulates the beam 762b by $P\sin\omega_0 t$. The relative phase between the two coherent beams 761 and 762 is given by $\phi + \dot\phi t$. The phase difference, $\phi$, is caused by the difference in index of refraction of the air at the two-wavelengths of the beam 50 and 54 of the SHI subsystem 32. The change in phase difference versus time, $\dot\phi t$, is caused by linear motion of the stage, to which the mirror 42 is attached, during the time the SHI signal is measured. For these conditions, the optical signal at the output of the SHI subsystem measured by a detector, such as the detector 128, is given by $s(t)=I_a+I_m \cos(P\sin\omega_0 t-\phi-\dot\phi t)$. The signal is sampled at five points given by $\omega_0 t=\pi/5, 3\pi/5, \pi, 7\pi/5,$ and $9\pi/5$. Examples of the interference waveform detected by the detector 128 for different values of $\phi$ and the values at the five sampling times are shown in FIGS. 14A–14H. The roman numerals I, II, III, IV and V correspond, respectively, to the five samples taken at $\omega_0 t= \pi/5, 3\pi/5, \pi, 7\pi/5,$ and $9\pi/5$. Each roman numeral represents one laser pulse, and, accordingly, five pulses can be used to determine the phase difference $\phi$.

Continuing the above analysis, assume that at these points $\dot\phi t=-4C, -2C, 0, 2C,$ and $4C$, where C is a constant related to the stage velocity, the sampling interval, and the wavelength, $\lambda_2$. For these conditions, the values of the five samples are given by $$s(1)=I_a+I_m\cos(P \sin\pi/5-\phi-4C),$$

$$s(2)=I_a+I_m\cos(P \sin 3\pi/5-\phi-2C),$$

$$s(3)=I_a+I_m\cos(\phi),$$

$$s(4)=I_a+I_m\cos(P \sin 7\pi/5-\phi+2C),$$

$$s(5)=I_a+I_m\cos(P \sin 9\pi/5-\phi+4C). \tag{1a–e}$$

The value of the phase is determined from the shape of the sampled function, which can be characterized by four shape parameter values:

$$r(1)=(1/2I_m)(s(1)-s(5))=-\sin(P \sin(\pi/5)-4C)\sin\phi,$$

$$r(2)=(1/2I_m)(s(2)-s(4))=-\sin(P \sin(3\pi/5)-2C)\sin\phi,$$

$$r(3)=(1/2I_m)(s(1)+s(5)-2s(3))=\cos(P \sin(\pi/5)-4C)\cos\phi-\cos\phi,$$

$$r(4)=(1/2I_m)(s(2)+s(4)-2s(3))=\cos(P \sin(3\pi/5)-2C)\cos\phi-\cos\phi. \tag{2a–d}$$

By making use of the relations $$\sin^2(\pi/5-4C)+\cos^2(\pi/5-4C)=1, \text{ and}$$

$$\sin^2(3\pi/5-2C)+\cos^2(3\pi/5-2C)=1, \tag{3a,b}$$

the following equations can be written:

$$\frac{(r(1))^2}{\sin^2} + \frac{(r(3)+\cos\phi)^2}{\cos^2\phi} = 1, \text{ and} \tag{4a, b}$$

$$\frac{(r(2))^2}{\sin^2\phi} + \frac{(r(4)+\cos\phi)^2}{\cos^2\phi} = 1.$$

By subtracting equations (4a) and (4b) and solving them algebraically, an expression for determining $\phi$ is obtained:

$$\tan\phi = \pm\sqrt{\frac{\left(\frac{(r(1))^2}{r(3)} - \frac{(r(2))^2}{r(4)}\right)}{(r(3)-r(4))}}. \tag{5}$$

The quadrant of the solution for $\phi$ can be determined by the signs of the shape parameters, as shown in Table 1.

TABLE 1

Quadrant of the Inverse Tangent Solution.

| Quadrant | r(1) | r(2) | r(3) | r(4) |
|---|---|---|---|---|
| I | − | − | − | − |
| II | − | − | + | + |
| III | + | + | + | + |
| IV | + | + | − | − |
| Assumptions | 1. | 2. | NA | NA |

1. $0 < (P \sin(\pi/5) - 4C) < \pi,$
2. $0 < (P \sin(3\pi/5) - 2C) < \pi.$

Figure 15:
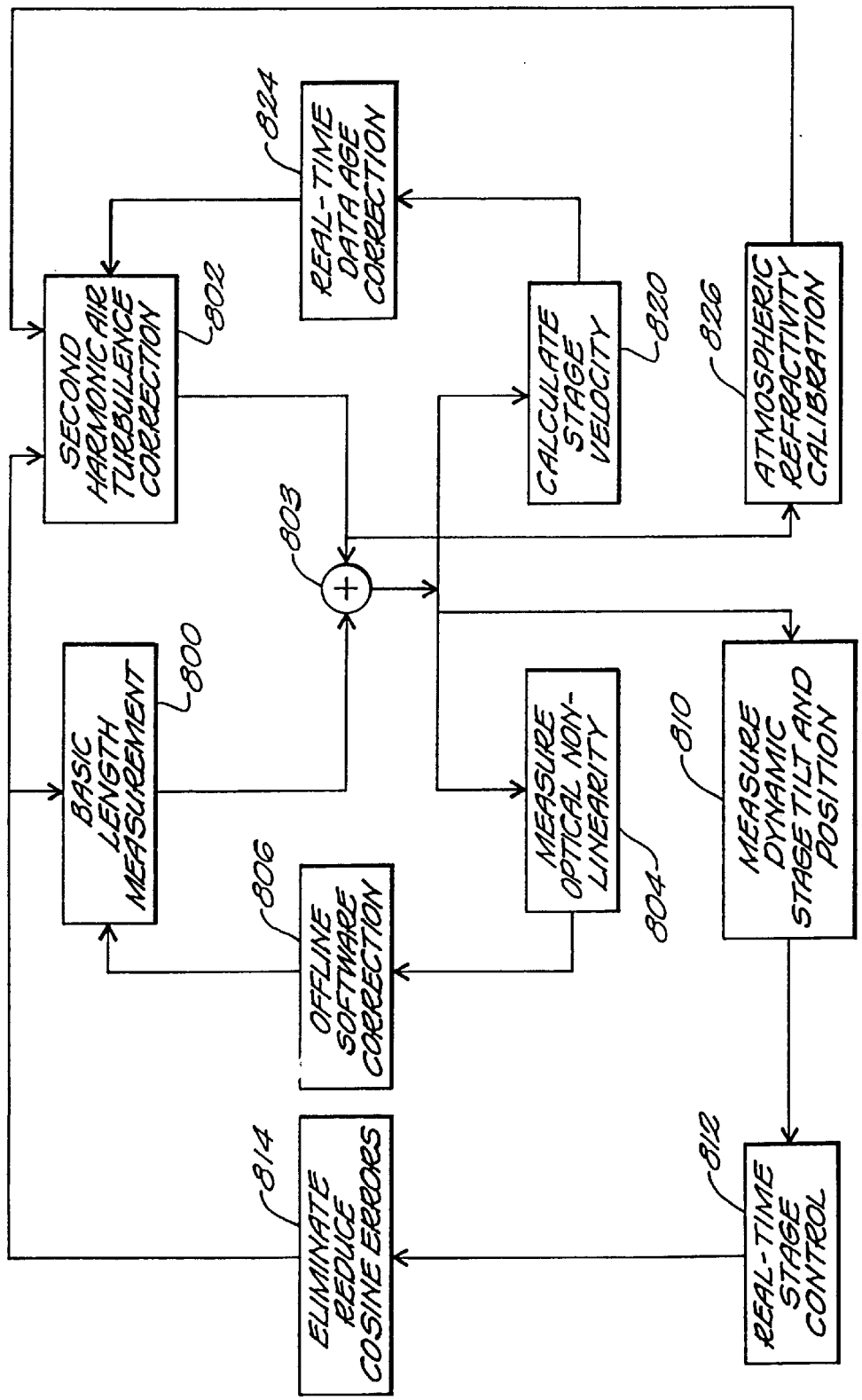
FIG. 15 is a schematic block diagram illustrating one example of how the SHI and BLM subsystem of FIG. 1 can interact to reduce errors in the ATCI system due to data aging, dynamic stage tilt, and optical nonlinearities resulting from polarization crosstalk.

Achieving total system accuracy at the one nanometer level is enhanced by linking the BLM subsystem 34 and the SHI subsystem 32 together in four ways. The high performance available from the SHI subsystem described here will enable the performance of the BLM 34 subsystem to be improved, and vice versa. In this manner, the entire composite system 30 can be bootstrapped to achieve better performance. FIG. 15 schematically illustrates one process by which the two SHI and BLM subsystems, 32 and 34 in FIG. 1, respectively, can be linked together, such as by software, to achieve a high accuracy ATCI system 30. The plus sign 803 indicates that a basic length measurement 800, made by the BLM subsystem 34 is combined with air turbulence measurements 802, made by the SHI subsystem 32, in a variety of ways. First, the two measurement are combined to perform a calibration 826 to correct the basic length measurements 800 for atmospheric turbulence. This calibration improves the accuracy of measurement such that other errors can now be characterized and measured. For example, optical non-linearities 804, due, for example, to cross-talk between beam polarizations, can be measured and corrected by a software routine 806 to improve the accuracy of the basic length measurements 800. In addition, the dynamic stage tilt 151 and position 810 can be measured and coupled to real time control of the stage position 812 for reducing cosine errors 814 in the basic length measurements 800. Further, the stage is typically moving during measurement of the position of the reflecting mirror 44. Accordingly, the amount of air in the measurement path 45 is increasing or decreasing as a function of time, and the atmospheric refractivity calibration 826 does not account for this increase or decrease. However, the stage velocity can be determined to sufficient accuracy from basic length measurements 800 to apply real time data age correction 824 to the second harmonic turbulence correction 802 to account for the extra atmosphere present in the measurement path, as an intermediate measure useful until another atmospheric refractivity calibration 826 is performed.

Calibration of the composite system 30 for high accuracy operation uses knowledge of atmospheric characteristics at the wavelengths of operation of the BLM subsystem and the SHI subsystem. In the following discussion, specific wavelengths of operation are described, although the present invention is not limited to specific wavelengths. Thus, the beam 35 of the BLM subsystem can have a wavelength of $\lambda_3=\lambda_4=633$ nm. The SHI subsystem can use a wavelength of $\lambda_2=\lambda_g=532$ nm for the beam 50 and a second harmonic wavelength of $\lambda_2=\lambda_{UV}=266$ nm for the beam 54. For these wavelengths, a distance with length in vacuum of l will be measured as $l_r$, $l_g$, and $l_{UV}$ respectively, where $$l_r = n_r l$$
$$l_g = n_g l$$
$$l_{UV} = n_u l \quad (6a\text{-}c)$$

The refractivities at each wavelength are given by $$\alpha_r = n_r - 1 = \left[\left(237.2 + \frac{526.3 v_1^2}{v_1^2 - v_r^2} + \frac{11.69 v_2^2}{v_2^2 - v_r^2}\right)\frac{P_d}{T} + \left(\frac{651.7 v_3^2}{v_3^2 - v_r^2}\right)\frac{P_w}{T}\right] \times 10^{-7} \quad (7a\text{-}c)$$

$$\alpha_g = n_g - 1 = \left[\left(237.2 + \frac{526.3 v_1^2}{v_1^2 - v_g^2} + \frac{11.69 v_2^2}{v_2^2 - v_g^2}\right)\frac{P_d}{T} + \left(\frac{651.7 v_3^2}{v_3^2 - v_g^2}\right)\frac{P_w}{T}\right] \times 10^{-7}$$

$$\alpha_u = n_u - 1 = \left[\left(237.2 + \frac{526.3 v_1^2}{v_1^2 - v_{UV}^2} + \frac{11.69 v_2^2}{v_2^2 - v_{UV}^2}\right)\frac{P_d}{T} + \left(\frac{651.7 v_3^2}{v_3^2 - v_{UV}^2}\right)\frac{P_w}{T}\right] \times 10^{-7}$$

where
$v_1 = 114,000$ cm$^{-1}$,
$v_2 = 64,400$ cm$^{-1}$,
$v_3 = 111,575$ cm$^{-1}$,
$v_4 = 15,802.78$ cm$^{-1}$,
$v_g = 18,796.99$ cm$^{-1}$,
$v_{UV} = 37,593.98$ cm$^{-1}$,
$P_d$ is the partial pressure of dry air, and
$P_w$ is the partial pressure of water vapor, both in millibars.

For convenience, these three equations for the refractivities can be rewritten as $$\alpha_r = \frac{1}{T}(C_1 P_d + C_4 P_w) \quad (8a\text{-}c)$$

$$\alpha_g = \frac{1}{T}(C_2 P_d + C_5 P_w)$$

$$\alpha_u = \frac{1}{T}(C_3 P_d + C_6 P_w)$$

The BLM subsystem 34 measures the optical path length $l_r = n_r l$ using 633 nm radiation. The SHI subsystem 32 measures the difference between the optical path length at the green and UV wavelengths for any stage (i.e., mirror) position, $\delta l = n_g l - n_u l$. Measurements are made at two stage positions, $l_1$ and $l_0$ (separated by $\Delta l$, as indicated by reference numeral 153 in FIG. 1), with both the basic length measurement and the SHI subsystem. Only the difference between the two measurements is sensed by the interferometers. The measurements are $$\Delta l_r = n_r' l_1 - n_r l_0, \quad (9a, b)$$

$$\Delta(\delta l) = (n_g' l_1 - n_{UV}' l_1 - n_g l_0 + n_{UV} l_0) = \frac{\lambda_{UV}}{2\pi} \phi.$$

The prime super script in the above equations indicates the refractivities at the time of the measurement of the stage at position $l_1$. (Note that for the phase, $\phi$, to accurately track the changing optical path difference, it is tracked through arbitrary multiples of $2\pi$.) It is desirable to determine $\Delta l = l_1 - l_0$ from these measured values. Basically, there are three equations relating the $\Delta l$, $l_0$, and $l_1$ measured distances and the refractivities at the three wavelengths.

$$\Delta l_r = \Delta l + \alpha_r' l_1 \quad -\alpha_r l_0 \quad (10a\text{-}c)$$
$$\Delta(\delta l) = 0 + (\alpha_g' - \alpha_{UV}') l_1 \quad -(\alpha_g - \alpha_{UV}) l_0$$
$$0 = \Delta l - l_1 \quad +l_0$$

A better physical understanding of the relation between the SHI measurement and the basic length measurement can be obtained by rewriting equations (10a–c):

$$\Delta l_r = \Delta l + (\alpha_r' - \alpha_r)\left(\frac{l_1 + l_0}{2}\right) + (\alpha_r' + \alpha_r)\left(\frac{l_1 - l_0}{2}\right) \quad (11a, b)$$

$$\Delta(\delta l) =$$
$$(\alpha_g' - \alpha_u' - \alpha_g + \alpha_u)\left(\frac{l_1 + l_0}{2}\right) + (\alpha_g' - \alpha_u' + \alpha_g - \alpha_u)\left(\frac{l_1 - l_0}{2}\right)$$

The refractivity terms can be simplified using the definitions $\alpha'_x - \alpha_x = \Delta\alpha_x$, and $(\alpha'_x + \alpha_x)/2 = \bar{\alpha}_x$, resulting in $$\Delta l_r - \Delta l = \Delta\alpha_r\left(\frac{l_1 + l_0}{2}\right) + \bar{\alpha}_r \Delta l \quad (12a, b)$$

$$\Delta(\delta l) = (\Delta\alpha_g - \Delta\alpha_u)\left(\frac{l_1 + l_0}{2}\right) + (\overline{\alpha}_g - \overline{\alpha}_u)\Delta l$$

The goal is to relate the SHI measurement, $\Delta(\delta l)$, to the difference between the basic length measurement and the true distance, $\Delta l_r - \Delta l$. Combining equations (12a) and (12b) shows one way in which this correction can be performed.

$$\Delta l_r - \Delta l = \overline{\alpha}_r \Delta l + (\Delta(\delta l) - (\overline{\alpha}_g - \overline{\alpha}_u)\Delta l)\left[\frac{\Delta\alpha_r}{(\Delta\alpha_g - \Delta\alpha_u)}\right] \quad (13)$$

where $\Delta(\delta l)$ is measured, $\overline{\alpha}_r$ and $(\overline{\alpha}_g - \overline{\alpha}_u)$ is a correction coefficient that depends on the average refractivities, $\Delta l$ is estimated, and $$\left[\frac{\Delta\alpha_r}{(\Delta\alpha_g - \Delta\alpha_u)}\right]$$

is referred to herein as the SHI correction, and depends on the source of air turbulence, (i.e., the change in the refractivity of the air).

The correction coefficients can be measured. First, SHI and BLM measurements are made at the same position, thus $\Delta l=0$. In this case, the relationship between the error in the basic length measurement induced by the atmosphere and the SHI measurement as given by equation (13) becomes $$\Delta l_r = \left(\frac{\Delta\alpha_r}{\Delta\alpha_g - \Delta\alpha_u}\right)\Delta(\delta l). \quad (14)$$

Second, SHI and BLM measurements are made at different positions, and a time average is taken to eliminate the effects of atmospheric turbulence. In this case, the time average of the constant term is equations 12a,b that contains $$\frac{l_1 + l_0}{2}$$

is zero, and the relationship between the error in the basic length measurement and the SHI measurement given by equation (13) depends only the terms containing $\Delta l$ and is given by $$\Delta l_r - \Delta l = \left(\frac{\overline{\alpha}_r}{\overline{\alpha}_g - \overline{\alpha}_u}\right)\Delta(\delta l). \quad (15)$$

Thus the average properties of the refractivities can be determined in principle either by interferometer measurement, or by calculations based on the measured humidity, such as by using the atmospheric sensors 150, 157 and 159 in FIG. 1, and the present invention can be practiced using either or both techniques.

Additional understanding of the problem comes from making use of knowledge about the functional form of the refractivity of air versus wavelength, temperature, pressure, and water vapor variations.

The most likely sources of air turbulence along the measured path 45 are fluctuations in air temperature, total pressure, and variations in moisture content. Temperature and composition variations are governed by diffuision, and thus can exist over relatively long times. Variations in moisture content, without associated overall pressure fluctuations, can exist for times long relative to the measurement time, and thus should also be considered. Two cases are considered: in Case I, $P_d$ and $P_w$ are constant and T varies, and in Case II, T is constant and $\delta P_d = -\delta P_w$.

Variations in pressure will occur due to low-frequency sound waves and pressure gradients associated with flowing air. Variations in temperature and overall pressure will have the same effect, so considering temperature changes will be sufficient.

In Case I, turbulence due to temperature fluctuations, equations (8a–c) for the refractivities can be used to determine expressions for the refractivity changes:

$$\alpha'_r = \frac{1}{(T + \delta T)}(C_1 P_d + C_4 P_w) \quad (16\text{a-c})$$

$$\alpha'_g = \frac{1}{(T + \delta T)}(C_2 P_d + C_5 P_w)$$

$$\alpha'_u = \frac{1}{(T + \delta T)}(C_3 P_d + C_6 P_w)$$

and $$\Delta\alpha_r = \frac{\delta T}{(T + \delta T)}\alpha_r \quad (17\text{a-c})$$

$$\Delta\alpha_g = \frac{\delta T}{(T + \delta T)}\alpha_g$$

$$\Delta\alpha_u = \frac{\delta T}{(T + \delta T)}\alpha_u$$

leading to the result for temperature- or pressure-dominated air turbulence that $$\frac{\Delta\alpha_r}{(\Delta\alpha_g - \Delta\alpha_u)} = \frac{\alpha_r}{(\alpha_g - \alpha_u)} \quad (18)$$

and the correction coefficient for the "deadpath," $(l_1+l_0)/2$, is the same as the correction coefficient for the distance between measurements $\Delta l$. This value of the SHI correction coefficient is independent of temperature, but is calculated using the measured value of the humidity. For the wavelengths assumed and a relative humidity of 25%, the SHI correction coefficient which multiplies the difference between the green and uv path lengths is approximately 14.4.

In Case II, atmospheric fluctuations due to humidity fluctuations, the changes in refractivity are given by $$\alpha'_r = \frac{1}{T}(C_1(P_d + \delta P_d) + C_4(P_w - \delta P_d)) \quad (19\text{a-c})$$

$$\alpha'_g = \frac{1}{T}(C_2(P_d + \delta P_d) + C_5(P_w - \delta P_d))$$

$$\alpha'_u = \frac{1}{T}(C_3(P_d + \delta P_d) + C_6(P_w - \delta P_d))$$

and $$\Delta\alpha_r = \frac{\delta P_d}{T}(C_1 - C_4) \quad (20\text{a-c})$$

$$\Delta\alpha_g = \frac{\delta P_d}{T}(C_2 - C_5)$$

$$\Delta\alpha_u = \frac{\delta P_d}{T}(C_3 - C_6)$$

Leading to the result for humidity-dominated air turbulence that $$\frac{\Delta \alpha_r}{(\Delta \alpha_g - \Delta \alpha_u)} = \frac{C_1 - C_4}{(C_2 - C_5 - C_3 + C_6)} \quad (21)$$

In this case, the value of the SHI correction coefficient is approximately −12.17.

In the case where the temperature and humidity variations are correlated, a correction coefficient with a value different from that calculated for Cases I and II will result. Table 2 shows possible values of the correction coefficient for possible correlated variations in humidity and temperature.

TABLE 2

Possible SHI Correction Coefficient Values.

| δ T (K) | δ P$_d$ (mbar) | $\frac{\Delta \alpha_r}{(\Delta \alpha_g - \Delta \alpha_u)}$ | Optical Path Length Change over 1 m Path (nm) |
|---|---|---|---|
| −0.15 | −1 | 29.14 | 17.6 |
| −0.1 | 0 | 14.39 | 9.0 |
| −0.05 | 1 | 0.66 | 0.4 |
| 0 | 2 | −12.17 | −8.2 |
| 0.05 | 3 | −24.17 | −16.7 |

Thus, the BLM subsystem and the SHI subsystem are linked together in several ways to achieve high accuracy interferometric measurements in the presence of air turbulence.

In one embodiment of the present invention,. the average values of the index of refraction for the atmosphere at the three system wavelengths, $\lambda_r$, $\lambda_g$, and $\lambda_{UV}$, are determined by making a humidity measurement accurate to approximately 1%, using a humidity sensor 150 in FIG. 1.

Next, the system is calibrated by measuring the value of the SHI correction coefficient $\Delta \alpha_r/(\Delta \alpha_g - \Delta \alpha_u)$ along the actual measurement path 45 for the current atmospheric conditions. This calibration can be performed by making a series of measurements with a fixed path length, i.e., $l_1 - l_0 = \Delta l = 0$. The ratio of fluctuations in the BLM subsystem to fluctuations in the SHI subsystem measurement will determine the SHI correction coefficient.

Finally, in operation, an approximate value of $\Delta l = l_1 - l_0$ is used. This value can be obtained from uncorrected measurements made by the BLM subsystem. This value, along with the calculated and measured values of the atmospheric refractivities and correction coefficients are used, as defined by equation (13), to produce a value for the error in the basic length measurement, which can be used to correct this measurement.

Note that a small error, $\epsilon$, in the estimate for $\Delta l$ used in equation (13) results in a small error in the correction term given by $$E = \varepsilon \overline{\alpha}_r - \varepsilon (\overline{\alpha}_g - \overline{\alpha}_u) \left[ \frac{\Delta \alpha_r}{\Delta \alpha_g - \Delta \alpha_u} \right] \quad (22)$$

For an error $\epsilon = 100$ nm, the first term in this equation is approximately 0.03 nm, and the second term varies over the range ±0.03 nm, depending on whether the turbulence is temperature-induced or humidity-induced.

Figure 16:
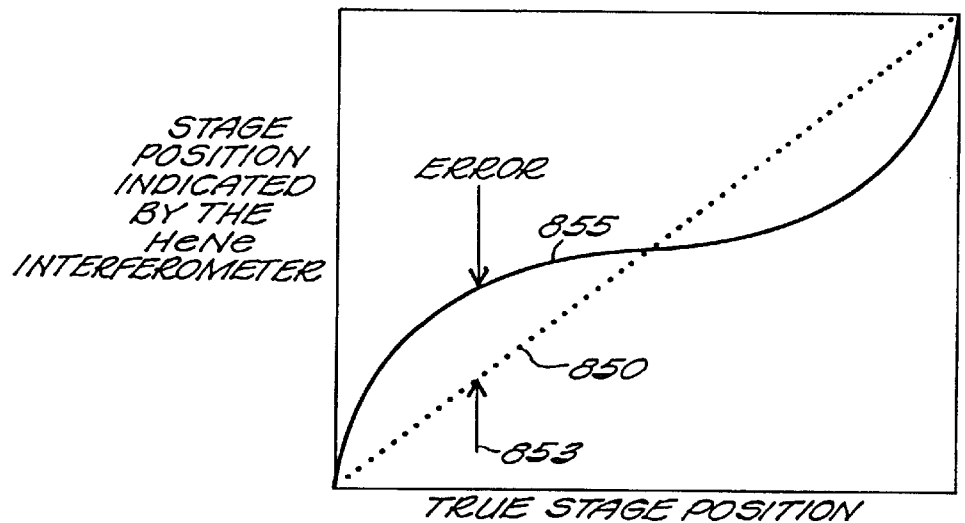
FIG. 16 is schematic graph illustrating non-linear error introduced into measurements made by a BLM system such as the BLM subsystem of FIG. 1 due to polarization crosstalk.

FIG. 16 illustrates one source of error in measurements made by the basic length measurement subsystem. The measured position 855 of the stage mirror 44 position varies from the actual position 850 due to polarization crosstalk between the reference path beams and the measurement path beam 35 in the BLM subsystem interferometer, and has been described by both Bobroff and Hewlett Packard in detail. See Bobroff "Residual Errors in Laser Interferometry From Air Turbulence and Nonlinearity," *Applied Optics* 26:2676–2682 (1987), and *Hewlett Packard Product Note* 5527 A/B-2 "Achieving Maximum Accuracy and Repeatability with the HP 5527 A/B Transducer System," September 1990, both of which are herein incorporated by reference. As shown in FIG. 16, this error is periodic with the mirror position. The error can have an amplitude of several nanometers, depending on the interferometer setup and a period and phase which is the same for every system. Correction of the BLM subsystem interferometer for air turbulence allows this component of the error budget to be measured and corrected in software.

When the length of the measurement path 45 changes rapidly with time, the measured SHI correction coefficient will lag the actual value that should be used for the longer path, because the data rate of the SHI subsystem is less than that of the BLM subsystem. For example, for an SHI data rate of 5 KHz, a stage velocity of 0.5 meter per second, and a double pass to the stage mirror, the error in the second harmonic subsystem data will be one nanometer. However, knowledge of the stage velocity as measured by the BLM subsystem 34 can allow the SHI correction coefficient to be adjusted in real time, to account for stage motion since the last SHI measurement, to eliminate this source of error. Based on the velocity of the stage, as determined by BLM subsystem measurements of the change in the position of the mirror 44, an intermediate value for the phase difference between the two beams of the SHI system is extrapolated.

Figure 17:
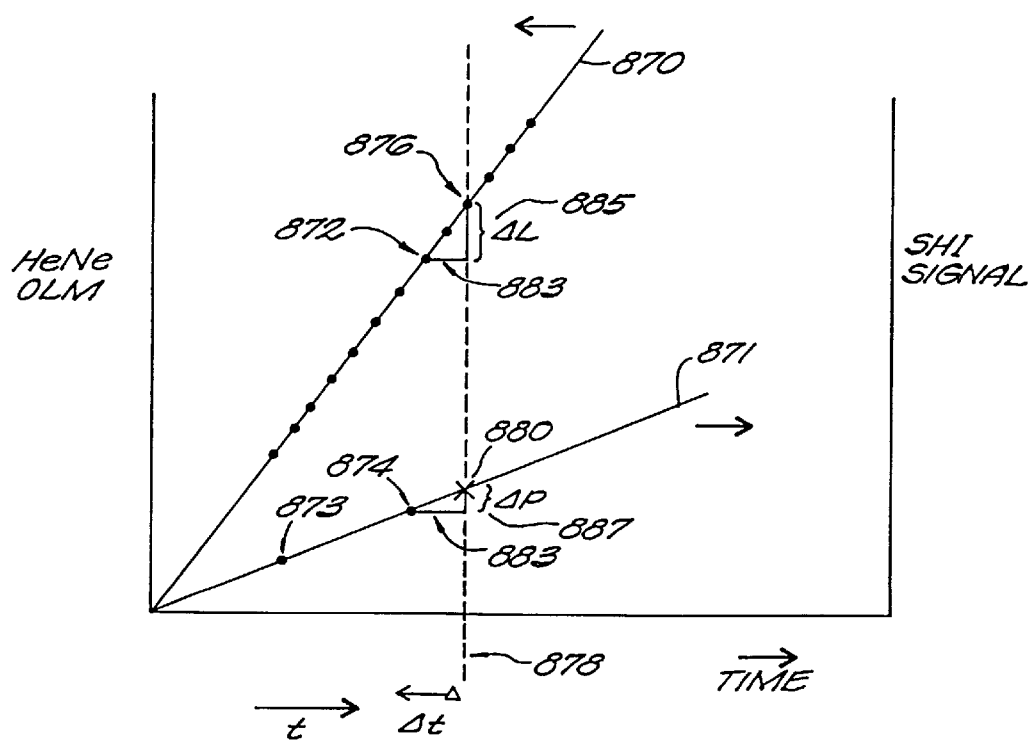
FIG. 17 is another schematic graph illustrating a technique for correcting the aging of data gathered by the SHI subsystem of FIG. 1 due to the velocity along the measurement path of the object being measured by the BLM subsystem of FIG. 1.

FIG. 17 is helpful in understanding corrections for the above-described data aging. The BLM subsystem 32 generates the data points on the line 870, such as the data point 872, which represents the distance to the stage mirror 44. The SHI subsystem generates data points that fall, ideally, on the line 871, and each data point, such as the data point 874, represents the difference in the optical path length traveled by the two beams of the SHI subsystem, such as the beams 50 and 54 of FIG. 1. However, because of the higher data rate of the BLM system, there are more data points on the line 870.

Consider the data point 876 on the line 870. The last data point from the SHI system available for calculating a correction factor to be applied to correct the data point 876 for atmospheric turbulence is the point 874 on the SHI line 871, which is not timely. However, based on knowledge of the change in time $\Delta t$ since the last SHI measurement point 874 was taken, and the change in length $\Delta L$ indicated by the reference numeral 885, a value for $\Delta P$, indicated by reference numeral 887, is determined such that the point 880 can be extrapolated from the point 874 and applied to calculate a extrapolated correction factor that can be applied to correct the BLM data point 876 for atmospheric turbulence. $\Delta P$ is related to $\Delta L$ by the average refractivities of the atmosphere along the measurement path at the two wavelengths of the two beams, 50 and 54, of the SHI subsystem 32 of FIG. 1, follows:

$$\Delta L = (\overline{\alpha}_2 - \overline{\alpha}_1) \Delta P$$

where $\overline{\alpha}_2$ = the average refractivity of air at the shorter wavelength of the SHI subsystem.

$\overline{\alpha}_1$ = the average refractivity of air at the longer wavelength of the SHI subsystem.

Finally, as discussed above, dynamic tilt of the stage to which the mirror 44 is typically attached will cause errors in the second harmonic subsystem. For similar reasons, the BLM heterodyne interferometer also is subject to stage tilt induced errors. In all lithography systems, multiple BLM heterodyne interferometer axes are used to measure the stage rotation as well as the position. In many systems, stage pitch and yaw are also measured. By correcting the BLM heterodyne subsystem measurements for air turbulence, better control of the real-time stage tilt can be achieved. Holding the tilt constant during stage motion will greatly improve the accuracy of the composite measurement system.

Figure 18:
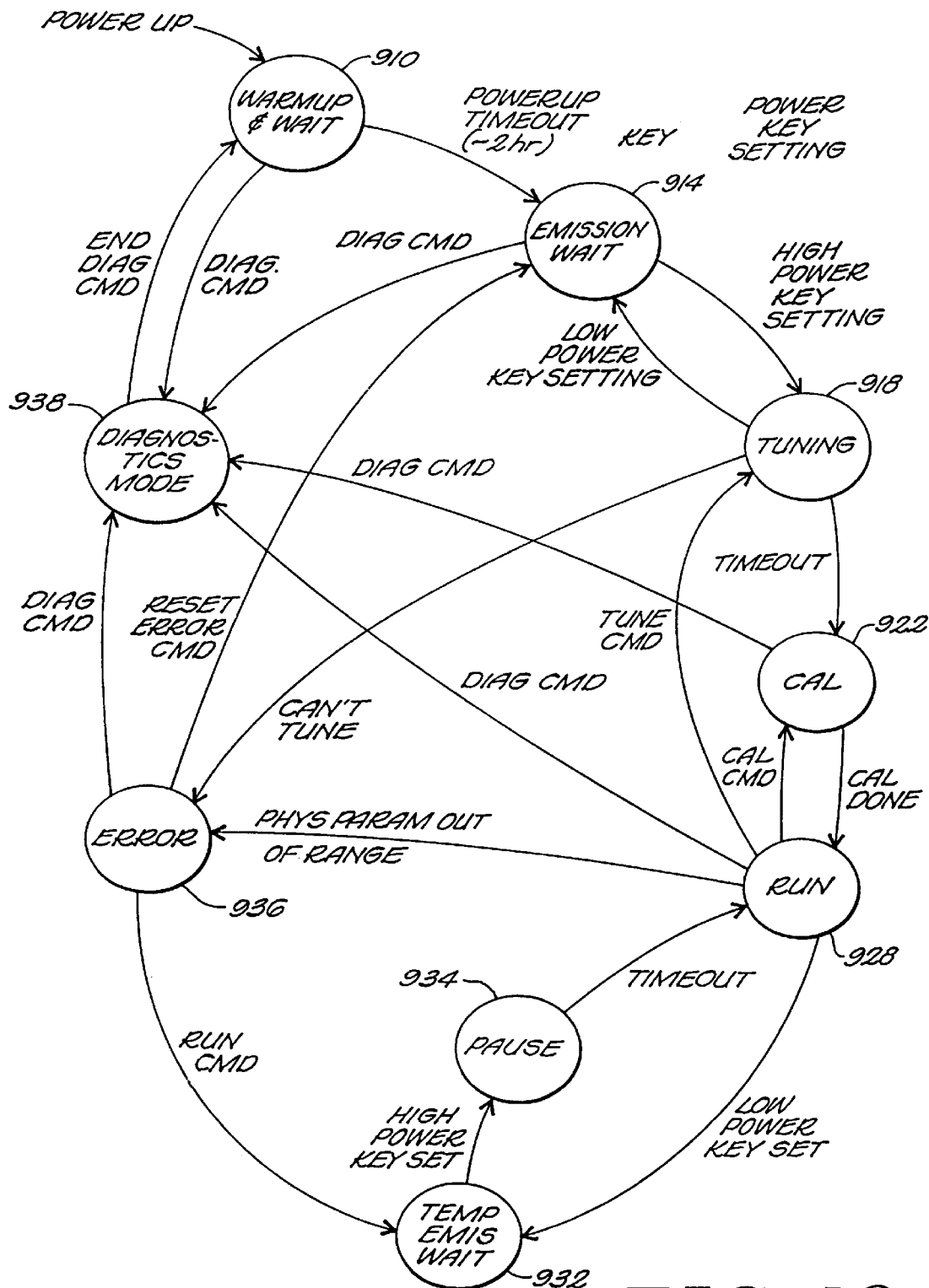
FIG. 18 is a state diagram for a software architecture of a control processor for controlling, calibrating, running, and diagnosing faults in the operation of the ATCI system of FIG. 1.

Coordinated operation and calibration of the SHI subsystem 32 and the BLM subsystem controller 34 of the overall ATCI system 30 is important for obtaining optimum performance. A software architecture to link SHI and BLM subsystems together is an important element of the overall ATCI system. FIG. 18 shows nine states useful for an ATCI system 30 and defines the conditions which move the system from one software state to another. These nine states are listed here with a brief general description of the purpose of each and the requirements which are typically met by the system software and hardware in each state.

The operation of the present invention is further illustrated by the following exemplary protocol.

Typical lasers sources 48 for supplying radiation at wavelength $\lambda_1$ for the SHI subsystem 32 are subject to frequency drifts. Achieving stable operation of the SHI subsystem usually requires a laser stability over one minute of better than 50 MHz. Achieving this level of frequency stability typically requires that the laser 48 be running at operational power levels for some minimum time. The purpose of the warm-up & wait state 910 is to require a system clock to be set to zero whenever the laser 48 is turned on after having been off for a sufficient time to cool to ambient temperature.

If the warm-up state 910 is entered and the clock indicates that the laser 48 has been running for more than the minimum time referred to above, the system will meet the "Time-out" requirement and immediately move to the Emission Wait state 914.

In some circumstances, the laser 48 may be turned off for a short time, insufficient to allow it to cool to ambient temperature. One approach to handle the "short offtime" situation is to require a warm-up time equal to the time off, up the above-mentioned minimum time. A second approach is an override which will be available allowing the operator to proceed immediately to the Emission Wait state 914.

Laser eye safety may require that the ATCI system 30 operate at two different power levels, one for system alignment and one for normal operation. The laser power emitted by the laser 48 can be set using a key switch to low power mode (approximately 1 part in 10,000 of normal power), used primarily for alignment, or to a full power mode, with sufficient output power for frequency doubling, normally used in the Tuning state 918, the Calibration state 922, the Run state 928, or the Diagnostics state 938.

The Emission Wait state 914 tests for the key position. In the Low Power position, the system remains in the Emission Wait state 914, and in the High Power position, the system moves to the Tuning state 918.

Optimum performance of the ATCI 30 system is obtained when the input doubler such as doubler 54 and the receiver doubler such as the doubler 122, for each measurement channel are operated at an optimum temperature. At the optimum temperature, the maximum amount of SHI subsystem optical power is obtained, thus providing the best system signal-to-noise performance. In addition, angular deviations in the received beam cause the received beam to be subject to varying amounts of birefringence as it travels through the receiver doubler 122. This birefringence introduces a varying phase between the fundamental (beam 50) and second harmonic (beam 54) wavelengths in the SHI subsystem, resulting in system errors. This birefringence is minimized when the doubler is operated at the optimum temperature. The purpose of the Tuning state 918 is to automatically achieve and maintain this optimum temperature of the doubler 122.

Doubler retuning is typically required when the system is first turned on, when the system has been in the Emission Wait state 914, and at periodic intervals during system operation.

Doubler retuning can be accomplished by a hill-climbing metric and a binary search algorithm, as appreciated by those of ordinary skill in the art. In this algorithm, the temperature of the doubler is varied, and the second harmonic power is monitored. Each time the Tuning state is entered, this algorithm will require a fixed time to reach an optimum temperature.

Three conditions can cause the system to exit the Tuning state 918: (1) when the key switch is set to Low Power, resulting in a return to the Emission Wait state 914, (2) when a tuning fault, such as no UV power, occurs, resulting in an Error state 936 or (3) when the tuning algorithm is completed, resulting in a move to the Calibration state 922.

The purpose of the Calibration state 922 is to measure the atmospheric conditions in the stepper enclosure, and use the measured values to achieve the best possible compensation for variations in temperature, pressure, and humidity.

In the Calibration state 922, the stage is moved to a fixed position, with interferometer paths for each axis (i.e., measurement path) of 10 cm or more. The BLM subsystem output, $l_r(t)$, and the SHI subsystem output, $\delta l(t)$, are recorded for approximately 30 seconds. Each of these signals is in nanometers. Conversion of the raw signal to nanometers is described in the Run state 928 definition. A correction term coefficient, $\Delta K$, is calculated to minimize the mean-squared difference between the variations in the basic length subsystem measurement and the second harmonic subsystem measurement:

$$\epsilon_1^2 = \langle (l_r(t) - \Delta K \delta l(t))^2 \rangle \qquad (23)$$

Provisions for another calibration sequence can be included in the system software. This calibration sequence provides information about the average index of refraction properties of the atmosphere surrounding the lithography stage. In this sequence, the stage is scanned through different positions at a nominal constant rate at a nominal constant rate, and the output of the BLM subsystem, $l_r(t)$, and the SHI subsystem, $\delta l(t)$, are recorded. A series of measurements, at different positions, allows the time average to be calculated as follows. A constant, $\overline{K}$, is chosen to minimize the value of the mean-squared difference between the scaled SHI subsystem output and the output of the BLM subsystem.

$$\epsilon_2^2 = \langle (l_r(t) - \overline{K} \delta l(t))^2 \rangle \qquad (24)$$

The constant, $\overline{K}$, can also be determined by measuring the average temperature, pressure, and water vapor content of the atmosphere such as by using the sensors 150, 157 and 159 of FIG. 1, and using equations 7a–c for the refractivities. $\overline{K}$ is calculated from the refractivities using the equation $$\overline{K} = \frac{1+\overline{\alpha}_r}{\overline{\alpha}_g - \overline{\alpha}_u}. \quad (25)$$

The partial pressure of water vapor can be calculated from the relative humidity using the equation $$P_w = RH \times P_{sat}$$

where $$P_{sat} = 10^{(8.4-2353/T)} \quad (26a,b)$$

Completion of the calibration command moves the system to the Run state 928.

The Calibration state 922 has an associated "Calibration Wait" state, with exit criteria being movement of the system stage to a fixed "long path" position. This movement can be accomplished by a stepper control computer and indicated by a status flag, or manually by the system operator.

If the optimum choice of the correction term coefficient does not reduce the rms error, defined by $\sqrt{\epsilon_1^2}$, to less than 10 nm, provision should be made for a warning, such as "Unfavorable Atmospheric Conditions," to the system operator. This condition could occur in the presence of large, uncorrelated variations in temperature and humidity. Similarly, if the constant $\Delta K$ is outside of certain bounds, for example, ±20, the same warning could be issued.

In the Run state 928, a real-time correction term is provided at a rate sufficient to enable the correction to be applied to the BLM subsystem during normal system operation. In this state, several calculations are performed continuously.

First, the detected intensity of the SHI signal is digitized, and the phase of this signal is calculated. The algorithm for calculation of the phase from the detected signal is described by equations 1–5 and Table 1.

Second, the BLM subsystem information is read. This measurement can be available at a rate of approximately 100 KHz. The measurement is in fractions of the wavelength used to make the measurements and can be converted to nanometers by multiplying by the wavelength of the basic length measurement system.

Third, the relative humidity, temperature, and total barometric pressure in the measurement environment may be sensed, such as by sensors 150, 157 and 159 of FIG. 1, or alternatively estimated by the signal processor 42. These values are used to calculate the refractivity at each of the system wavelengths using the equations for the refractivity given above. The calibration constant K can be calculated from these values.

Fourth, a correction term to be subtracted from the basic length measurement is calculated from the SHI subsystem phase and the two calibration coefficients, $\overline{K}$ and $\Delta K$, using the equation $$\delta(\hat{l}_r(t)) = \Delta K[\delta l(t) - l_r(t)/\overline{K}]. \quad (27)$$

This expression for $\delta(\hat{l}_r(t))$ produces a measurement which is affected by the average refractivity of the air at wavelength $\lambda_3$. This measurement has the advantage that $\hat{l}_r(t) - \delta(\hat{l}_r(t))$ can be used in exactly the same way as $l_r(t)$, the uncompensated basic length measurement.

Exit from the Run state 928 can occur in several ways. The operator can set the Key to the low power position. The Tuning state 918 or the Calibration state 922 can be invoked from the control computer, or a physical parameter out of range condition can occur.

If the key switch is set to the low power emission mode when the system is in the Run state, the Temporary Emission Wait state 932 is entered. The Temporary Emission Wait state 932 could occur when system realignment is required, or the stepper enclosure is opened for any reason.

When this state is entered, a timer is started to record the duration of the Temporary Emission Wait state 932.

When the Key Switch setting is returned to high power, the Pause state 934 is entered.

The Pause state 934 is designed to allow the system optics and doubler crystals to return to a steady state operating temperature after a Temporary Emission Wait state 932.

A timer determines the duration of the Pause state 934. This timer is set equal to the duration of the Temporary Emission Wait state 932, up to the typical warm-up time from a cold start, which should be sufficient to return to normal operating temperatures.

The purpose of the Error state 936 is to alert the system operator to a condition in which the BLM subsystem or the SHI subsystem is not operating properly. Normally, the error state is entered from the Tuning state 918, Calibration state 922, or Run state 928.

Because entry to the Error state 936 can sometimes be caused by external conditions which require only a reset of the system, the system can be sent to the Emission Wait state 914 by the reset error command. If the key setting is in the high power position, the system will immediately enter the Tuning state 918. In some cases, the system operator may determine that the system should be returned directly to the Run state 928 without tuning the doubler temperature or recalibration the atmospheric parameters. In this case, the Run command will cause the system to enter the Pause state 934.

If the cause of the Error is unknown, the operator can issue the Diagnostics command, which causes the system to enter the Diagnostics Mode state 938.

The system should enter the Temporary Emission Wait state 932 when the Run command is issued, since the operator could have set the Key Switch to low power while the system was in the Error state 936.

The Diagnostics Mode state 938 is designed to allow the system operator or a service technician to request information about system operation from the various components of the system architecture. This information includes not only status and control registers, but also temporal information (both raw and processed data) from each system measurement channel.

Other than providing access to all system operation, the primary function of the Diagnostics Mode state 938 is to allow the system operator or a remote operator to request that the signal processing hardware provide different information than is normally available. The following information available in Diagnostics Mode state 938 can include
1. Raw (sampled but unprocessed) detector data.
2. Each of five sampled values or four shape parameters.
3. SHI subsystem signal. These data are normally provided by the signal processing hardware in Run mode.

All other system states will typically be accessible in the Diagnostics Mode state 938 by invoking the proper commands. These commands provide a "Shadow Mode" of operation. However, to exit the Diagnostics Mode state 938 and return to normal operation, the End Diagnostics Command returns the system to the Warm-up & Wait state 910. From this state 910, the system will proceed through an entire tuning and calibration sequence to insure high accuracy operation.

In all states where the key switch is set to High Power, the system should provide a SHI subsystem signal, such as is normally available in the Run state 928. Calibration factors necessary to produce this signal can be either (1) default values, (2) values calculated using the measured pressure, temperature, and humidity, or (3) the most recently measured calibration factors.

In summary, an important feature of the present invention is the use of a pulsed laser interferometer system to measure the air turbulence in a measurement path and a continuous wave laser interferometer system such as the BLM subsystem of FIG. 1 to measure the basic optical path length along the measurement path. Many types of pulsed lasers can be used, including, but not limited to, an active or passive Q-switched laser and a mode-locked laser. Also, the BLM subsystem can use a two-frequency heterodyne interferometer, or can use a single frequency interferometer employing, for example, the phase dither technique.

As indicated above, the present invention can also use a device to equalize the optical path length for the two wavelengths used in the SHI subsystem, typically by incorporating a dichroic reflecting mirror which reflects at 2, a high reflecting mirror at $\lambda_1$, and a mechanical path length adjustment.

The phase dither technique can also be applied to either $\lambda_1$ or $\lambda_2$ as a means to detect the phase difference between the two optical beams used in the SHI subsystem.

Phase dither can be introduced in a laser interferometer system by various means, including, but not limited to, an electro-optic modulator, a photoelastic modulator, an optical fiber subjected to a periodic mechanical force, an acoustic optic modulator, and a mirror subjected to a periodic mechanical force.

The phase difference between two beams is often a useful quantity to determine in a laser interferometer apparatus. The present invention includes an algorithm, intended to be useful in many applications involving determining phase differences between beams, that uses as few as five samples to determine the aforementioned phase difference. Of course, more than five samples can be used by employing techniques, including, but not limited to, averaging successive samples to obtain five averaged samples, computing a sliding phase value from five successive samples and then averaging the resulting phase value, or dropping intermediate sample points for each computation of the phase. Also the sample points can be taken over more than one period of the phase modulation, and the sample times can be carefully controlled with respect to the beginning of each phase modulation period, P. More specifically, the sample points can be taken at times P/10, 3P/10, 5P/10, 7P/10, and 9P/10, when a size-wave modulation is used.

The algorithm computation can be made in a variety of ways, including, but not limited to, using a general purpose digital computer or a digital signal processing circuit.

The interferometer system of the present invention can use a reference path to eliminate errors in the components prior to the beamsplitter assembly to compensate for several errors, including the deadpath error, errors due to laser wavelength jitter and drift, errors in the position of the optical phase modulator, and thermal drifts in the optics common to the $\lambda_1$ and $\lambda_2$ paths of the SHI for determining air turbulence. The measurement and reference optical beams can be separated in space as they exit the beamsplitter. Furthermore, the two coherent optical beams can be distinguished by laser polarization as they exit the beamsplitter, and the two coherent optical beams can be distinguished temporally as they exit the beamsplitter.

The present invention also encompasses incorporating matched optical coatings to compensate for the relative phase shift introduced between s- and p-polarizations when they are transmitted or reflected from a multilayer optical coating used to combine the basic length measurement subsystem and the second harmonic interferometer subsystem. Furthermore, the angle of incidence of the optical beams from the basic length measurement subsystem and the second harmonic subsystem can be less than 45 degrees to the substrate normal to minimize the phase difference induced by the optical coating.

The basic length measurement subsystem measurement and the SHI subsystem measurement can be combined in a computer system to calibrate the SHI subsystem and to improve overall composite system performance.

The present invention involves a calibration procedure to characterize atmospheric effects. Part of this calibration procedure can involve making repeated measurements with a fixed path length and comparing the output of the basic length measurement subsystem to the output of the second harmonic subsystem to help determine parameters such as the average atmospheric refractivities at the wavelengths of interest, such as the wavelengths of the basic length measurement system and the second harmonic measurement system. Also, a humidity sensor can be used to assist in determination of the average atmospheric refractivities at the wavelength of the basic length measurement subsystem and the second harmonic subsystem. Also, the non-linearity of a heterodyne subsystem, such as the basic length measurement system can be measured with air turbulence correction and removed via digital processing.

Furthermore, the age of the second harmonic subsystem data caused by stage motion can be corrected using velocity information from the basic length measurement subsystem. Also, dynamic stage tilts can be controlled using air turbulence corrected measurements of stage roll, pitch, and yaw.

Described above are particular features and embodiments of the present invention. It will be apparent to those of ordinary skill in the art, possessed of the teachings herein, that particular apparatus and steps described above are examples; there can be variations to those steps and apparatus. Accordingly, all matter contained in the above description or shown in the accompanying drawings be interpreted as illustrative and not in a limiting sense. Furthermore, one can follow more or less than all the steps disclosed, modify one or more of the steps, or change the order of some or all steps, without departing from the spirit or scope of the invention. Similarly, one can substitute components, modify components, or eliminate apparatus or components without departing from the spirit or scope of the invention These variations are therefore considered a part of the present invention.

Having described the invention, what is claimed as new and desired to be secured by Letters Patent is:

1. An interferometer system for characterizing an atmosphere present along a measurement path, comprising a two-wave length interferometer further comprising, a pulsed laser source for generating a first laser light beam having a first wavelength, said first light beam for projection along the measurement path, means for generating a second pulsed laser light beam, having a wavelength different from said first laser light beam, for projection along the measurement path, and detection means for receiving said first and second beams after projection of said beams along the measurement path and for detecting the phase difference between said beams, the phase difference being related to the refractivity of the air along the measurement path.

2. The interferometer system of claim 1 wherein said means for generating a second beam includes a harmonic multiplier for receiving at least a portion of said first light beam and for producing therefrom said second light beam having a second wavelength that is a harmonic of said first light beam.

3. The interferometer system of claim 2 wherein said harmonic multiplier is a frequency doubler for doubling the frequency of said first beam.

4. The interferometer system of claim 3 wherein said frequency doubler includes a beta barium borate doubling crystal for generating said second beam.

5. The interferometer system of claim 3 wherein said frequency doubler includes a potassium dihydrogen phosphate doubling crystal for generating said second beam.

6. The interferometer system of claim 3 wherein said frequency doubler includes a periodically-poled material for generating said second beam.

7. The interferometer system of claim 6 wherein said periodically-poled material includes lithium niobate.

8. The interferometer system of claim 3 wherein said frequency doubler does not include a lens element for focusing said at least a portion of said first beam.

9. The interferometer system of claim 1 wherein said means for generating a second beam includes an optical parametric oscillator for receiving at least a portion of said first light beam and for producing therefrom said second light beam.

10. The interferometer system of claim 1 wherein said pulsed laser source includes a passive Q-switched laser.

11. The interferometer system of claim 1 wherein said pulsed laser source includes an active Q-switched laser.

12. The interferometer system of claim 1 wherein said pulsed laser source includes a mode-locked laser.

13. The interferometer system of claim 1 including an optical path length compensation apparatus for receiving and transmitting said first and second beams prior to projection along the measurement path and for adjusting an optical path length traveled by one of said beams to compensate for a frequency spread of at least one said first and second beams.

14. The interferometer system of claim 13 wherein said optical path length compensation apparatus includes a dichroic mirror for reflecting one of said first and second beams and transmitting other of said beams, a mirror for reflecting the other of said beams and wherein the position of said mirror relative to said dichroic mirror is adjustable.

15. The interferometer system of claim 1 including an optical phase modulator for periodically modulating with a period P the phase of at least one of said first and second beams for facilitating the detection of the phase difference between said first and second beams.

16. The interferometer system of claim 15 wherein said optical phase modulator includes a beam modulator chosen from the group consisting of: an electro-optic modulator, a photoelastic modulator, an optical fiber subjected to a periodic mechanical force, an acousto-optic modulator, and a mirror mechanically coupled to a transducer.

17. The interferometer system of claim 15 wherein said modulator means further comprises a polarizing beamsplitter for splitting said first and second beams to travel along first and second paths respectively, a first quarterwave plate and reflective mirror pair disposed in said first path, a second quarterwave plate and reflective mirror pair disposed in said second path, means for imparting a phase dither having a period P to said first beam traveling said first path, and wherein said polarizing beam splitter combines said first and second beams after reflection from said first and second reflective mirrors, respectively, to colinearly exit the polarizing beamsplitter.

18. The interferometer system of claim 17 comprising a path length compensator for adjusting the optical length of one of said first and second paths relative to the other of said first and second paths.

19. The interferometer system of claim 15 wherein said detection means includes means for producing an interference signal responsive to said phase difference and signal processing means for processing said signal to determine said phase difference between said first and second beams, said processing means including sampling means for sampling said signal to produce a set of five signal data points, shape parameter means for determining four shape parameters from said five data points, and means for determining said phase difference from said four shape parameters.

20. The interferometer system of claim 19 wherein said modulation means sinusoidally modulates said at least one of said first and second beams, and wherein said sampling means samples said signal such that the each of said set of five data points uniquely corresponds to one the following times relative to said modulation period P: P/10, 3P/10, 5P/10, 7P/10, and 9P/10.

21. The interferometer system of claim 19 wherein said sampling means samples said signal such that each of said set of five data points uniquely corresponds to one of the following phase differences between said first beam and said second beam of $\pi/5$, $3\pi/5$, $\pi$, $7\pi/5$, and $9\pi/5$.

22. The interferometer system of claim 19 wherein said processing means includes a computer processor having a central processing unit, a memory, and input/output unit.

23. The interferometer system of claim 19 wherein said processing means includes a digital signal processing circuit.

24. The interferometer system of claim 1 including a reference path apparatus element for receiving said first and second beams prior to said beams traveling along the measurement path, said reference element including a beam splitter for splitting first and second reference beams from said first and second beams, respectively, and for providing a reference path for said reference beams, and second detector means for detecting said first and second reference beams for producing a reference signal responsive to the phase difference therebetween, said reference signal for subtraction from said signal produced by said first detection means for correction of errors introduced to said first and second beams prior to projection thereof along the measurement path.

25. The interferometer system of claim 24 wherein said beam splitter includes a wave plate, a polarization sensitive beamsplitter, and a corner cube.

26. The interferometer system of claim 24 wherein said beam splitter includes a wave plate, a polarization sensitive beamsplitter, and a reflective plane mirror.

27. The interferometer system of claim 24 wherein said beam splitter includes a polarization modulator and a polarization sensitive beamsplitter.

28. The interferometer system of claim 1 wherein said detection means includes
   a harmonic multiplier means for receiving a least a portion of said first light beam after projection along the measurement path for producing therefrom a first frequency multiplied beam having a wavelength substantially equal to that of said second beam, and
   wherein said detector means determines the phase between said first and second beams by determining a phase difference between said first frequency multiplied beam and said second beam.

29. The interferometer system of claim 1 further comprising
   a basic length measurement interferometer for projecting a measurement beam along the measurement path and determining the change in position of a measurement reflector, said measurement beam and said first and second beams propagating along the measurement path for transmission to and reflection from the measurement reflector, and
   signal processing means responsive to said detection means and said basic measurement interferometer for using said phase shift determined by said two wavelength interferometer to correct the determination of a change in position of the measurement reflector by said basic measurement interferometer for error due to the presence of the atmosphere along the measurement path.

30. The interferometer system of claim 29 comprising
   a first beam splitting optical element having a first optical coating for reflecting a reflective beam and transmitting a transmissive beam such that both beams travel the measurement path, the polarization of said transmissive beam having a first polarization component incident on said optical coating a of a p-polarization and a s-polarization,
   means for compensating for the differential phase shift between said first polarization component and a second polarization component of said transmissive beam, said differential phase shift introduced by said first optical coating when said polarization includes said second component incident on said coating as the other of said p-polarization and said s-polarization, and
   wherein the transmissive beam includes one of said measurement beam and both of said first and second beams and the reflective beam includes the other of said one of said measurement beam and both of said first and second beams.

31. The interferometer system of claim 30 wherein the transmissive and reflective beams are incident on said first coating at an angle of incidence, and wherein said means for compensating includes
   a second optical element having a second optical coating for transmitting the transmissive beam, said transmissive beam being incident thereon at said angle of incidence, said first polarization component of said transmissive beam being incident on said second optical coating as said other of said s-polarization and said p-polarization and said second component of said transmissive beam polarization being incident on said second optical coating as the first of said s-polarization and said p-polarization.

32. The interferometer system of claim 31 wherein said angle of incidence is less than or equal to 15 degrees.

33. The interferometer of claim 29 wherein said signal processor means include means for correcting for the aging of said phase shift by said detection means due to the movement of the measurement reflector along the measurement path.

34. The interferometer system of claim 29 including
   an optical phase modulator for periodically modulating with a period P the phase of at least one of said first and second beams for facilitating the detection of the phase difference said first and second beams, said wherein said detection means for producing an interference signal responsive to the said phase difference and wherein said signal processing means includes
   sampling means for sampling said signal to produce a set of five signal data points such that each of said set of five data points uniquely corresponding to said signal at one the following times relative to said modulation period P: $P/10$, $3P/10$, $5P/10$, $7P/10$, and $9P/10$,
   shape parameter means for determining four shape parameters from said five data points, and
   means for determining said phase difference from said four shape parameters.

35. The interferometer system of claim 34 wherein said signal processing means includes
   first means for determining a first correction coefficient dependent on average refractivities of air at the wavelength of the measurement beam and of said first and second beams of said compensation interferometer,
   second correction factor means, responsive to said interferometer system, for determining second correction coefficient responsive to the change in the refractivities in the air present along the measurement path at said wavelength, and
   means for determining, from said first correction coefficient, said second correction coefficient, and from an uncorrected measurement of a change in position of the measurement reflector by said basic length interferometer a corrected determination of the change in position of the measurement reflector.

36. The interferometer system of claim 35 wherein said interferometer system includes an atmospheric sensor, and said means for determining a first correction coefficient includes means for calculating said average atmospheric refractivities using sensed atmospheric data from said sensor.

37. The interferometer system of claim 36 wherein said atmospheric sensor is a humidity sensor for sensing the humidity along the measurement path.

38. An interferometer system for determining the change in position of a mirror along a measurement path
   a basic length measurement (BLM) interferometer for projecting a measurement beam along the measurement path for reflection from the mirror for determining a changes in position of the mirror,
   a two wavelength interferometer for projecting first and second beams having different wavelengths along the measurement path and for determining the phase difference between said first and second beams after projection along the measurement path,
   first means for determining a first correction coefficient dependent on the average refractivities of air at the frequencies of the measurement beam and of said first and second beams of said compensation interferometer,
   second correction factor means, responsive to said two-wavelength interferometer said BLM interferometer, for determining second correction coefficient related to the change in the refractivities in the air present along the measurement path at said frequencies, and means for determining from said first correction coefficient, said second correction coefficient, and from an uncorrected measurement by said basic length interferometer of a change in position of the measurement reflector a corrected determination of the change in position of the measurement reflector.

39. The interferometer system of claim 29 wherein said basic length measurement interferometer includes a CW laser for producing said measurement beam.

40. A method of characterizing the atmosphere present along an interferometric measurement path, comprising the steps of generating a first pulsed laser beam having a first wavelength with a pulsed laser source and projecting said first beam along the measurement path, generating a second pulsed laser beam having a second wavelength different than said first wavelength and projecting said second beam along the measurement path, and detecting the phase difference between said beams after said beams have traveled the measurement path, the phase difference being related to the refractivity of the air along the measurement path.

* * * * *